US009719788B2

(12) United States Patent
Wellington

(10) Patent No.: US 9,719,788 B2
(45) Date of Patent: Aug. 1, 2017

(54) DETERMINING SPATIAL ORIENTATION INFORMATION OF A BODY FROM MULTIPLE ELECTROMAGNETIC SIGNALS

(71) Applicant: Robert J. Wellington, Bloomington, MN (US)

(72) Inventor: Robert J. Wellington, Bloomington, MN (US)

( * ) Notice: Subject to any disclaimer, the term of this patent is extended or adjusted under 35 U.S.C. 154(b) by 488 days.

(21) Appl. No.: 14/285,324

(22) Filed: May 22, 2014

(65) Prior Publication Data

US 2014/0336929 A1    Nov. 13, 2014

Related U.S. Application Data

(63) Continuation of application No. 12/786,137, filed on May 24, 2010, now Pat. No. 8,779,971.

(51) Int. Cl.
*G01S 19/53*    (2010.01)
*G01C 21/20*    (2006.01)
(Continued)

(52) U.S. Cl.
CPC .............. *G01C 21/20* (2013.01); *G01C 21/10* (2013.01); *G01S 19/36* (2013.01); *G01S 19/53* (2013.01); *G01S 3/52* (2013.01); *G01S 19/18* (2013.01)

(58) Field of Classification Search
CPC .......... G01S 19/18; G01S 19/36; G01S 19/53; G01S 3/52; G01C 21/20; G01C 21/10
(Continued)

(56) References Cited

U.S. PATENT DOCUMENTS 3,697,994 A    10/1972    O'Daniel
3,701,157 A    10/1972    Uhrig
(Continued)

FOREIGN PATENT DOCUMENTS

JP    2001-235533    8/2001
JP    2004-233185    8/2004
(Continued)

OTHER PUBLICATIONS

Aircraft Principal Axes, Wikipedia, the free encyclopedia, retrieved on Aug. 18, 2014, http://en.wikipedia.org/wiki/Aircraft_principal_axes, 4 pages.
(Continued)

*Primary Examiner* — Harry Liu
(74) *Attorney, Agent, or Firm* — Fish & Richardson P.C.

(57) ABSTRACT

A method for determining a spatial orientation of a body, including receiving, by receiving equipment located with the body, at least three electromagnetic signal sets, each of the received signal sets having been transmitted by a different one of at least three separate transmitters at different locations, detecting, for each one of the received signal sets, information that partially defines a direction from the body to the transmitter from which the signal set was received, the detected information including one of two angles that fully define an arrival direction from which the body received the signal set in relation to a body frame, the detected information not including a second of the two angles, and determining the spatial orientation of the body, including yaw, pitch, and roll angles relative to a navigation frame, using the detected information for each one of the received signal sets.

20 Claims, 12 Drawing Sheets

(51) Int. Cl.
*G01S 19/36* (2010.01)
*G01C 21/10* (2006.01)
*G01S 3/52* (2006.01)
*G01S 19/18* (2010.01)

(58) Field of Classification Search
USPC .................................................. 342/357.36
See application file for complete search history.

(56) References Cited

U.S. PATENT DOCUMENTS

| | | | |
|---|---|---|---|
| 5,101,356 A | | 3/1992 | Timothy et al. |
| 5,506,588 A | * | 4/1996 | Diefes .................... G01C 21/00 342/357.27 |
| 5,841,370 A | | 11/1998 | Lempicke |
| 6,018,315 A | | 1/2000 | Ince et al. |
| 6,088,653 A | | 7/2000 | Sheikh et al. |
| 6,163,021 A | | 12/2000 | Mickelson |
| 6,278,404 B1 | * | 8/2001 | Niles ........................ G01S 19/14 342/357.36 |
| 6,452,543 B1 | | 9/2002 | Tseng et al. |
| 6,520,448 B1 | | 2/2003 | Doty et al. |
| 6,580,389 B2 | | 6/2003 | Speyer et al. |
| 6,782,320 B1 | | 8/2004 | Bahder |
| 6,784,840 B2 | | 8/2004 | Menegozzi et al. |
| 7,395,987 B2 | | 7/2008 | Lindquist et al. |
| 7,397,422 B2 | | 7/2008 | Tekawy et al. |
| 8,275,544 B1 | * | 9/2012 | Wells .................... G01C 21/165 342/146 |
| 8,779,971 B2 | | 7/2014 | Wellington |
| 2002/0029110 A1 | | 3/2002 | Fukuda et al. |
| 2003/0078705 A1 | | 4/2003 | Kumar et al. |
| 2005/0159891 A1 | * | 7/2005 | Cohen ...................... G01S 19/06 701/470 |
| 2005/0242991 A1 | | 11/2005 | Montgomery et al. |
| 2008/0036652 A1 | | 2/2008 | Shore et al. |
| 2008/0068263 A1 | | 3/2008 | Tekawy et al. |
| 2010/0007555 A1 | * | 1/2010 | Ezal ...................... G01C 21/005 342/357.3 |
| 2010/0019963 A1 | * | 1/2010 | Gao ........................ G01S 5/0027 342/357.31 |
| 2011/0050903 A1 | * | 3/2011 | Vorobiev .............. A01B 69/003 348/148 |
| 2011/0161038 A1 | * | 6/2011 | Sutherland .............. F16L 55/48 702/103 |

FOREIGN PATENT DOCUMENTS

| | | |
|---|---|---|
| WO | WO 99/03000 | 1/1999 |
| WO | WO 01/46554 | 6/2001 |

OTHER PUBLICATIONS

Bahder, "*Attitude Determination from Single-Antenna Carrier-Phase Measurements*", U.S. Army Research Laboratory, Feb. 2, 2008, p. 1-10.
Gelb et al., "*Optimal Linear Filtering*", Applied Optimal Estimation, MIT Press 1974 (p. 102-112).
GPS Builders—2 Designer's Guide, Part No. 346/05759/007, Issue 1, Apr. 7, 1995 GEC Plessey Semiconductors, GPS Group, Wiltshire, UK.
International Preliminary Report on Patentability in International Application No. PCT/US2011/036993, mailed Dec. 6, 2012, 7 pages.
International Search Report & Written Opinion for Application No. PCT/US2011/036993, dated Sep. 7, 2011, 11 pages.
Jung et al., "*Attitude Sensing Using a GPS Antenna on a Turntable: Experimental Tests*" Journal of the Institute of Navigation, vol. 51, No. 3, (2004) p. 221-229.
Kaplan et al., "*Fundamentals of Satellite Navigation*", *Understanding GPS Principles and Applications*, Artech House Publishers, 1996 Chapter 2 (15-50) and Appendix (pp. 519-523).
Keaveny, "*Analysis and Implementation of a Novel Single Channel Direction Finding Algorithm on a Software Radio Platform*", Thesis paper submitted to the Faculty of Virginia Polytechnic Institute and State University, Feb. 11, 2005 (p. 1-82).
Kennedy and Woolsey, "*Direction-Finding Antennas and Systems*", Antenna Engineering Handbook, Chapter 39 1-37 (1993).
Madsen, "*Robust Spacecraft Attitude Determination Using Global Positioning System Receivers*", presented to the Faculty of the Graduate School of University of Texas at Austin, May 2003 (pp. 1-167).
New Zealand Office Action in NZ Application No. 605019, Mailed Sep. 20, 2013, 2 pages.
Phillips, "*Aircraft Flight Simulation*", Mechanics of Flight, published by John Wiley and Sons, 2004 (pp. 867-915).
Psiaki, "*Attitude Sensing Using a Global-Positioning-System Antenna on a Turntable*", AIAA (2000) p. 1-13.
Psiaki, "*Extended Quest Attitude Detrmination Filtering*", presented at the Flight Mechanics Symposium, NASA Goddard Space Flight Center, May 18, 1999 (p. 1-15).
Rogers, "*Applied Mathematics in Integrated Navigation Systems*", AIAA 2007(p. 14-58).
Sanyal, "*Global Optimal Attitude Estimation using Uncertainty Ellipsoids*", Science Direct Systems & Control Letters 57 (2008) p. 236-245.
Vander et al., "*Computation of Eigenvalue and Eigenvector Derivatives for a General Complex-Valued Eigensystem*" Electronic Journal of Linear Algebra ISSN 1081-3810, A publication of the international Linear Algebra Society, vol. 16. pp. 300-314, Oct. 2007.
Appeal Decision in Japanese Application No. 2013512083, dated Jan. 23, 2017, 32 pages (with English translation).

* cited by examiner

DETERMINING SPATIAL ORIENTATION INFORMATION OF A BODY FROM MULTIPLE ELECTROMAGNETIC SIGNALS

CROSS-REFERENCE TO RELATED APPLICATIONS

This application is a continuation application of U.S. application Ser. No. 12/786,137 (now U.S. Pat. No. 8,779, 971), filed May 24, 2010. The disclosure of the prior application is considered part of (and is incorporated by reference in) the disclosure of this application.

TECHNICAL FIELD

This specification relates to determining spatial orientation information (for example, the orientation and/or rate of change in the orientation) of a body based upon multiple electromagnetic signals received at the body from different transmitters of a navigational system, and the use of spatial orientation information in navigation of the body.

BACKGROUND

Determining the spatial orientation, and/or its rate of change, for a body is useful in numerous different applications. One example is an airborne body such as an airplane or a helicopter, where the spatial orientation of the airborne body may be used in the navigation of the body from its current location to a desired location or in a desired direction. In operation, the spatial orientation information (including the orientation and its rate of change) may be provided to a person who may use the information to pilot the airborne body manually, or may be provided to a computer-controlled navigation system that controls the navigation of the airborne body. Another application in which the spatial orientation of a body is useful is in underground applications such as underground drilling for oil, natural gas and the like. In such underground applications, orientation information for an underground drill head that cannot be directly observed by sight, for example, may be useful or even necessary in navigating the drill in an intended direction or to an intended target location. It should be understood that these two general examples of applications in which spatial orientation information may useful are intended to be illustrative, and that there are many other present and future applications in which spatial orientation information may similarly be useful.

In the context of an airborne body such as an aircraft, for example, traditional techniques for determining spatial orientation information include on-board mechanisms such as a compass to determine a directional heading for the aircraft, and in addition inertial navigation equipment (accelerometers and gyroscopes, for example) that are capable of determining the aircraft's attitude, including the conventionally defined pitch, yaw and roll components of attitude. By way of background, pitch angle describes an upward or downward rotation of the nose of the aircraft, the roll angle describes a rotation about the body of the aircraft (or in other words, tilting upward or downward of the wings), and the yaw angle describes the angle of side rotation (or in other words, the nose of the aircraft moving to the right or the left). On-board navigation systems such as these traditional types may also provide information as to the rate of change in the aircraft's attitude. While in many applications, such on-board navigational systems are entirely sufficient, in many applications they may not be sufficiently accurate or responsive, by themselves. For example, one issue that may be present with inertial navigation systems is possible drift in its spatial orientation determinations over time, and as such there may be a need to periodically calibrate or correct for such drift. In addition, the rate of change in the spatial orientation may be so dramatic or rapid for a particular body that such spatial orientation determination mechanisms are simply ineffective by themselves.

Another more recently developed technique for determining spatial orientation information for a body uses electromagnetic transmissions received from an external transmission system, such as microwave cellular tower transmissions or satellite transmissions. One example class of such electromagnetic transmission systems is a global navigation satellite system (GNSS). A GNSS, such as the Global Positioning System (GPS) of the United States or the Global Navigation Satellite System (GLONASS) of Russia, consists of several orbiting satellites that each make electromagnetic transmissions that are received by a body, and are used by the body for navigation.

A common and primary use that is made of received GNSS transmissions is to determine the current position of the body. This is known quite ubiquitously, as being used by aircraft and automobiles for example. Generally in the GNSS's operation, a body receives transmissions from at least four different satellites of the GNSS, and uses those transmissions to determine the current position of the body. One method for determining the three-dimensional position (longitude, latitude, and altitude) of a body includes receiving electromagnetic signals transmitted by satellites or beacons positioned at known locations. Small electric receivers can be used to calculate position based upon these received electromagnetic signals. The transmissions of GNSS satellites typically include time-stamp information as to when the transmission was sent by the satellite, so that the receiving body is able to use a time of receipt to calculate the body's distance from the particular satellite. In addition, the transmissions of GNSS satellites also conventionally include the current position of the orbiting GNSS satellite, or more specifically, ephemeris data that describes the orbital information for the satellite. As such, the body is provided with information regarding the current position of each of the satellites whose transmissions it has received, and uses that information, plus the distance each satellite is away from the body, to determine the position of the body.

In addition to being used for determining position, GNSS's have also been used more recently to determine spatial orientation information for a body. To do this, a body has been equipped with a receiving and directional antenna system that is capable of detecting a precise direction, defined by a vector, from which the electromagnetic transmission was received. In particular, the receiving system with the directional antenna system in such systems is configured to detect a vector direction for the received GNSS transmission that is defined by two angles, namely, an azimuth angle and an elevation angle. Knowing the precise receipt vector for each of the GNSS transmissions enables spatial orientation information to be determined in these bodies. In particular, given the precise vector directions, in addition to the time of transit for each transmission from satellite to the body and the known position of the satellite that sent the transmission, a processing system is able to calculate spatial orientation information for the body, including for example conventionally defined yaw, pitch and roll components. As a drawback, however, receiving and directional antenna systems that are capable of detecting both an azimuth angle and an elevation angle are generally complex and impose space requirements aboard bodies whose orientation is being determined, as compared for example to simpler receiving and antenna systems.

Certain antenna configurations can also be used as rotation sensors to make measurements that determine the orientation of the body without the aid of motion or additional sensors. Such systems use the GNSS signals arriving at antennas on the body to determine the direction toward the GNSS satellites relative to the body orientation. Geometry implies that the direction from the body toward a single satellite can be described by specifying the three angles formed between the satellite and the three body axes. The cosines of these angles are used to specify a unique direction cosine vector for each satellite expressed in the coordinate system for a given frame. Traditional systems that use GNSS for attitude estimation will take measurements of the direction cosine vectors made in the body frame and compare these measurements to satellite positions known in the navigation frame. Another embodiment of such system will describe the angle between a designated body x-axis and the satellite as an "angle-off-bore-sight". The angle-off-bore-sight can also be described as an "elevation" angle for the satellite relative to the plane defined by the body y and z axes. Given that the elevation angle has been measured, then the satellite direction cosine vector can be determined by measuring an additional "azimuth" angle that specifies how the satellite direction is rotated around the x-axis. Traditional systems determine the body orientation relative to the navigation frame by measuring the vector directions (i.e., both the elevation and the azimuth angles) toward at least two satellites, and using these body measurements and the known direction of the satellites in the navigation frame to derive the actual rotation of the body frame relative to the navigation frame.

SUMMARY

In one general aspect, systems, components and methods are provided that enable spatial orientation information to be determined for a body without requiring that the direction from which a navigating transmission from an external navigational system transmitter is received be detected with the degree of precision required in prior systems. In this general aspect, the systems, components and methods described in this specification are able to use less precise directional information and still adequately and effectively determine spatial orientation information for the body. As such, the systems, components and methods described in this specification enable the use of, although do not require, receiving and directional antenna systems that may be less complex and/or that may impose less space requirements within or on the body than has been the case in prior systems.

In general, one innovative aspect of the subject matter described in this specification can be embodied in methods that include the actions of receiving, by receiving equipment located with the body, at least three sets of electromagnetic signals, each of the received sets of electromagnetic signals having been transmitted by a different one of at least three separate transmitters at different locations; detecting, for each one of the received sets of electromagnetic signals, partial directional information that partially defines a direction from the body to the transmitting transmitter from which the set of electromagnetic signals was received, the detected partial directional information including a first one angle of two angles that fully define an arrival direction from which the body received the set of electromagnetic signals in relation to a body frame, the detected partial directional information not including a second one of the two angles that fully define the arrival direction; and determining the spatial orientation of the body, including yaw, pitch, and roll angles relative to a navigation frame, using the detected partial directional information for each one of the received sets of electromagnetic signals. Other embodiments of this aspect include corresponding systems, apparatus, and computer programs, configured to perform the actions of the methods, encoded on computer storage devices.

These and other embodiments can each optionally include one or more of the following features. The first one angle can be an azimuth angle that defines the arrival direction relative to an azimuth angle plane defined relative to the body frame. The second one angle can be an elevation angle that defines the arrival direction relative to an elevation angle plane defined relative to the body frame. Moreover, the first one angle can an elevation angle that defines the arrival direction relative to an elevation angle plane defined relative to the body frame, and the second one angle can be an azimuth angle that defines the arrival direction relative to an azimuth angle plane defined relative to the body frame.

The method can further include detecting, for each one of the received sets of electromagnetic signals, a rate of change of partial directional information, the detected rate of change of partial directional information including a rate of change of the first one angle of two angles that fully define the arrival direction from which the body received the electromagnetic signal set in relation to the body frame; and determining an angular rate of change of the spatial orientation of the body frame with respect to the navigation frame, where the determining includes using the detected rate of change of partial directional for each one of the received sets of electromagnetic signals and the determined spatial orientation. The sensor data provided by the receiving equipment can be transformed into one of the partial directional information or the rate of change of the partial directional information.

The method can further include detecting, for each one of the received sets of electromagnetic signals, an acceleration of the partial directional information for the set of electromagnetic signals, the detected acceleration of the partial directional information including an acceleration of the first one angle of two angles that fully define the arrival direction from which the body received; and determining an angular acceleration of the spatial orientation of the body frame with respect to the navigation frame, where the determining includes using the detected acceleration of the partial directional information for each one of the received sets of electromagnetic signals and the determined spatial orientation and the determined angular rate of change. The sensor data provided by the receiving equipment can be transformed into the acceleration of the partial directional information.

A further method can include receiving, by receiving equipment located with the body, at least three sets of electromagnetic signals, each of the received sets arriving at the body in a different one of at least three separate known navigation directions in relation to a body frame; transforming the known direction of arrival into a navigation reference data set for each one of the received electromagnetic signal sets; detecting, for each one of the received electromagnetic signal sets, azimuth angle information relative to a body azimuth axis in a body frame for the known navigation direction from which the electromagnetic signal set was received, the azimuth angle information not including detected elevation angle information; transforming the detected azimuth angle information in the known navigation frame into a body measurement data set; and determining the spatial orientation, including yaw, pitch, and roll angles, of the body frame with respect to the known navigation frame.

These and other embodiments can each optionally include one or more of the following features. The determining can include initializing an attitude quaternion representing an estimate of a present attitude of the body frame with respect to the known navigation frame; establishing an angle eigenmatrix representing an approximation using reference values from the navigation reference data set and the body measurement data set; iteratively refining the reference attitude quaternion and the angle eigenmatrix; and converting the refined attitude quaternion into equivalent yaw, pitch, and roll angles. The method can further include measuring rate of change of the azimuth angle information for each of the at least three received electromagnetic signal sets; transforming, for each of the at least three separate electromagnetic signal sets, the rate of change of the azimuth angle information into a body measurement rate matrix; and iteratively refining an approximation of an angular velocity of the body frame with respect to the known navigation frame using the body measurement rate matrices.

The iterative refinement can include: (a) initializing the angular velocity of the body frame; (b) estimating a quaternion derivative using the angular velocity of the body frame; (c) iteratively refining the rate matrices; (d) calculating the angular velocity of the body frame from the quaternion derivative; (e) calculating a quadratic error value; and (f) comparing the quadratic error value to a previous quadratic error value; where steps (b) through (f) are repeated for a number of iterations. Moreover, steps (b) through (f) can be repeated until the comparison of the quadratic error value and the previous quadratic error value are substantially identical.

The angular velocity of the body frame can be initialized to zero when the body frame is in an unknown or initial state. The angular velocity of the body frame can be initialized to a large rate when the body frame is in a rapidly rotating state. The initial angular velocity of the body frame can be used to adjust the rate matrices and to refine an estimate of an attitude or the rate of change of the azimuth angle information relative to the initial angular rate.

Other innovative aspects of the subject matter described in this specification can be embodied in a computer storage medium encoded with a computer program including instructions that when executed by data processing apparatus cause the data processing apparatus to perform operations as described. In addition, a system can include a receiver located with the body frame, including a directional transducer, and a body attitude determination module operable to perform operations as described.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
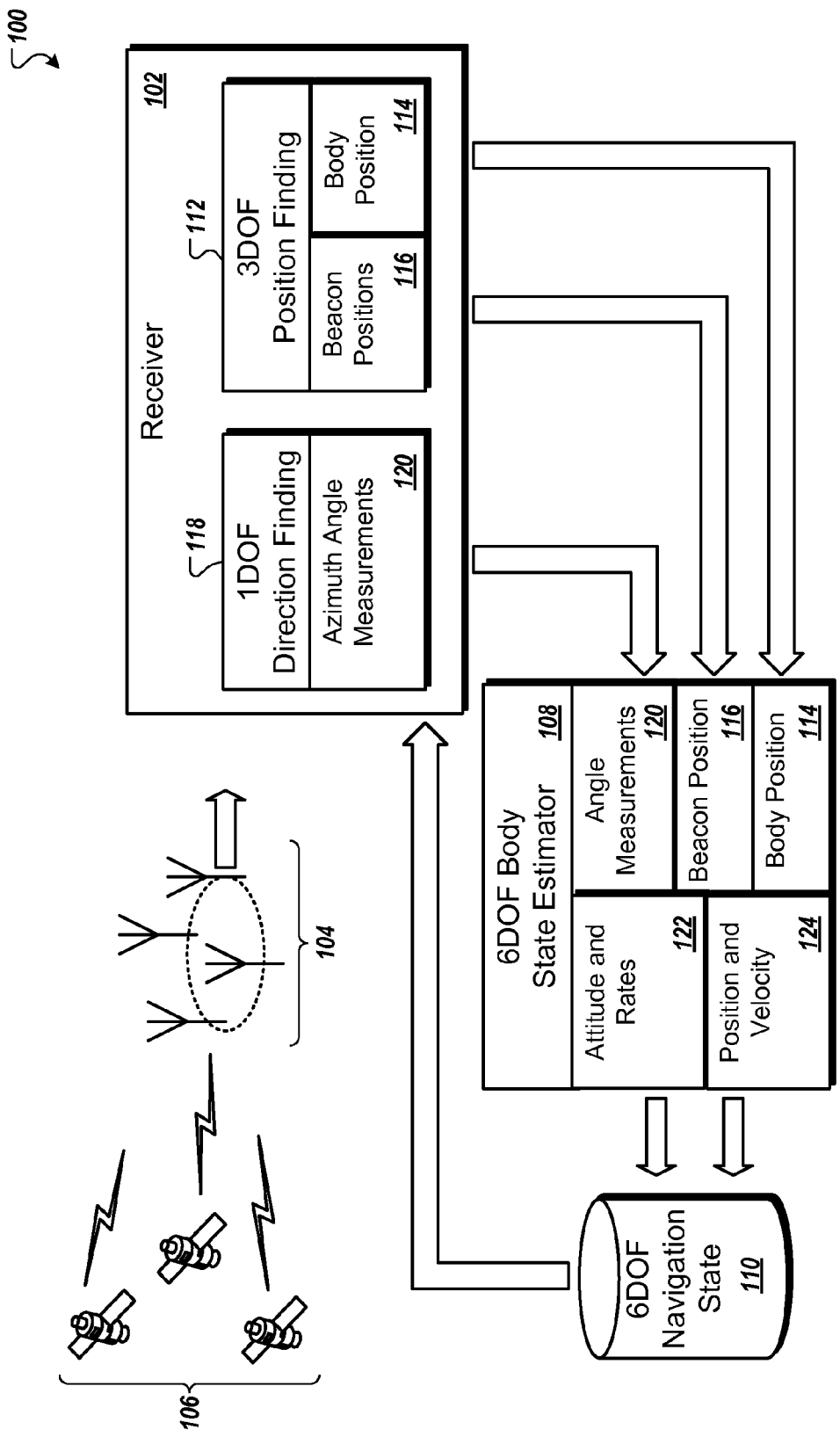
FIG. 1A is a diagram of a satellite navigation system and an example system for use on board a body that receives transmissions from the satellite navigation system to determine spatial orientation information of the body.

FIG. 1A is an example attitude information determination system 100 that may be equipped on a traveling body for determining the position and spatial orientation, or attitude, information of the body based upon navigational transmissions received from a navigation system such as a GPS system made up of multiple satellites, for example. Briefly, the system 100 includes a receiver 102 capable of receiving electromagnetic signals from a set of electromagnetic beacons (e.g., satellites) 106 through a directional transducer 104 and determining various input data from the received signals. As illustrated, the directional transducer 104 is a circular antenna array. In other implementations, a rotatable antenna, beamforming array, optical device, or similar directional sensor can be used as a directional transducer. The receiver 102 provides the input data to a six degrees of freedom (6DOF) body state estimator 108 which uses the data to determine at least the 6DOF measurements of the body in relation to a known navigation frame. The 6DOF measurements refer to three measurements for attitude (yaw, pitch and roll) and three measurements for the rate of change in attitude (rate of change in each of yaw, pitch and roll). The 6DOF attitude information measurements can then be output to a 6DOF data repository 110. The 6DOF attitude information measurements, in some examples, can be used to assist the receiver 102 in performing its functions, or to track the path of the body or to make navigational adjustment in course and/or correct for navigational errors within the path of the body. The receiver 102 includes a 3DOF position finding component 112 capable of determining a body position 114 and positions for each of the beacons 106 the latter being collected as a set of beacon positions 116. The three degrees of freedom for the 3DOF position finding unit 112 refer to a definition of a point of location (for the body and each of the beacons) within a navigational frame of reference. These three dimensions can be described as x, y, and z coordinates within the Earth-centered, Earth-fixed (ECEF) frame, also referred to as the public navigation frame. The ECEF frame is fixed within the Earth and its rotation, centered at the Earth's center. As such, the z-axis can be envisioned as being parallel to and aligned with the direction of the Earth's rotation, the x-axis pointing toward the intersection point of the equatorial plane and the Greenwich meridian, and the y-axis perpendicular to the Earth's surface in the direction that creates a right-handed coordinate frame for x, y, and z.

In other implementations, these three dimensions can be described as x, y, and z coordinates corresponding to East, North, and Up. For example, at the surface of the earth, an East-North-Up reference frame may be more convenient, while in the air or in space, the ECEF frame may prove more appropriate.

The three degrees of freedom in this example may be latitude, longitude and elevation measures. In some implementations, each of the beacons 106 may transmit its position information within the electromagnetic signal content, and that position information may be simply received by the 3DOF position finding unit 112. In other implementations, the 3DOF Position Finding unit 112 can derive each of the beacon positions 116 based upon identifying characteristics provided within the electromagnetic signals and a stored set of known beacon locations, which may include orbital path information from which it is possible to determine the location within the navigational frame of reference where the beacon is located at a given point in time. In the latter case, time stamp information provided in a transmission may be used to determine the beacon location from the orbital path information provided in the system 100. In addition to the position information, in some implementations, the body position 114 and the beacon positions 116 may also include velocity information and timestamp information. The velocity information, for example, can include the rate of change in the position of the directional transducer 104 as determined by the receiver 102 (e.g., using Doppler techniques).

The body position 114 and the beacon positions 116 may be used to determine directions of arrival at the body of the electromagnetic signals from each of the beacons 106, or in other words, vectors from the body to each of the beacons 106 (for the case in which the transmission from the beacon to the body is a line-of-sight transmission). These vectors from the body to each one of the beacons may be defined in a local navigation frame centered upon the body. To define a local navigation frame for the body, the ECEF frame, for example, can be translated without rotation to the center of the body (e.g., at the body position 114) to create a local navigation frame at the body position 114. The local navigation frame can serve as a reference attitude against with the actual body orientation (attitude) information may be defined.

The receiver 102 also includes a one degree-of-freedom (1DOF) direction finding component 118 to determine a set of azimuth angle measurements 120, including azimuth angles and, optionally, azimuth angle rates of change for a detected direction to each of the multiple beacons 106. The azimuth angle measurements 120 can be based upon an angular displacement around a single transducer 104 axis defined in a body frame. The term body frame, as used in this document, refers to a coordinate system or frame of reference that is defined in relation to the structure of the body for which the attitude information is being determined, and thus the body frame moves as the body moves, and thus moves relative to a navigation frame. By way of example, the body frame of an airplane may be defined as an X-Y-Z coordinate system in which the three axes intersect in the center of the airplane, the x-axis extends through the nose and center of the fuselage, the y-axis extends through the top and bottom of the airplane and perpendicular the x-axis, and the z-axis extends from one wing to the other wing and perpendicular to the x-axis and to the y-axis.

As used herein, the coordinates of the body frame are oriented such that the x-axis is the axis around which the directional antenna system can be rotated, and azimuth angles are measured in the y-z plane. This is simply a convention for consistency in the mathematical notation.

When determining the azimuth angle measurements 120, the vector directions of arrival for the electromagnetic signals received from the beacons 106 can each be projected by the directional transducer 104 upon a horizontal plane in the body frame that is perpendicular to the transducer 104 axis. The azimuth angle measurements 120 then relate to the disposition of each of the projected vectors in the azimuth plane in the body frame. The azimuth direction of each beacon from the directional transducer 104, for example, can be measured based upon the peak signal amplitude for each of the beacons 106 as the directional transducer 104 rotates around a single axis. In some implementations, the direction finding module 118 can resolve multipath signal arrivals to produce the final azimuth angle measurements 120. In other implementations, if the electronic signals from the directional transducer 104 include angular velocity information, the direction finding unit 118 can additionally calculate azimuth rate of change measurements, included within the azimuth angle measurements 120.

The 6DOF body state estimator 108 receives the angle measurements 120, beacon positions 116, and body position 114 from the receiver 102 and uses this information to calculate a spatial orientation or attitude (for example, yaw, pitch and roll angles) of the body and, optionally, an angular rate of change of the spatial orientation (again for example, rate of change of yaw, pitch and roll angles) of the body. These six pieces of attitude information may be defined in relation to a navigation frame, for example the ECEF, and may be stored in repository 110. The 3DOF spatial orientation measures of yaw, pitch, and roll angles may also referred to as Euler angles. The Euler angles define a set of rotations which can be used to rotate the local navigation frame so that the rotated frame is in alignment with the body frame.

Due to geometry, the navigation frame x-axis can be rotated to the actual direction of the body x-axis by applying two rotations in space. First, the navigation x-axis can be rotated toward the body frame x-axis through a yaw angle around the original navigation frame z-axis. Then, the new x-axis can be rotated through a pitch angle around the new y-axis. The new x-axis will now be pointed in alignment with the body frame x-axis. At this point, the roll angle can be used to rotate the new frame around the coincident body x-axis until the new y-axis and z-axis are pointed parallel to the corresponding y- and z-axes of the body frame. In some examples, a three-by-three rotation matrix such as a Direction Cosine Matrix (DCM) or a single 4-vector quaternion can be used to mathematically model the spatial orientation problem.

The 6DOF body state estimator 108 can begin to determine the 3DOF orientation of the body by transforming the angle measurements 120 into a body measurement data set, for example using the cosine of the detected azimuth angles. The 6DOF body state estimator 108 also transforms the beacon positions 116 and the body position 114 into a navigation data set, for example, using the lines of sight from the body position to the beacon positions. Other refinements may be applied while solving for the orientation to improve the spatial orientation estimate. Optionally, additional calculations can be made to solve for angular velocity or angular acceleration as well, for example, if azimuth rate or acceleration measurements are included within the azimuth angle measurements 120.

Once the 6DOF body state estimator 108 has calculated the spatial orientation estimate and the angular rates estimate as a set of attitude and rates measurements 122, the set of attitude and rates measurements 122 can be provided to the 6DOF repository 110, along with a set of body position and velocity measurements 124 (e.g., based upon the body position measurements 114).

As the body continues along its path (e.g., a helicopter in flight, a missile directed to a target, a truck on the road, or a drill beneath the Earth's surface), the system 100 can continue to collect information from the beacons 106 and estimate the changing position, orientation, and velocity of the body. Previously calculated estimates, in some implementations, can be used to speed the calculation of subsequent calculations or to improve the estimations produced by subsequent calculations. For example, the 6DOF navigation state 110 can be fed back to the receiver 102 to assist with signal processing functions such as, for example, beam steering or multipath resolution.

In some implementations, the 6DOF repository 110 may be remotely located from the body. For example, using wireless communications techniques, the attitude and rates measurements 122 and the body position and velocity measurements 124 can be provided to a remote site, where they can be used for monitoring or for remote guidance. The measurements, in some implementations, may be collected within the local 6DOF repository 110 and transmitted in batches to a remote system on a scheduled basis. In some implementations, the 6DOF body state estimator 108 may also be remote from the body for which the orientation information is being determined.

In addition to measurement collection, the attitude and rates measurements 122 and the body position and velocity measurements 124 can be used, in some examples, to make corrections to the present course of the body or to provide a graphical representation of the orientation of the body for an operator (e.g., plane, helicopter, drill, etc.) to make manual adjustments.

In some implementations, rather than collecting azimuth angle measurements 120, the direction finding module 118 can make angle-off-bore sight measurements, or otherwise measure only the elevation angle rather than the azimuth angle. An elevation angle can be considered corollary to an azimuth angle (e.g., a similar angle, but viewed from a different perspective within the navigational frame). Due to the sum of the elevation angle and the bore sight angle being ninety degrees, the elevation angle can easily be derived from the angle-off-bore sight measurement. Computational methods used by the 6DOF body state estimator 108 could be adjusted accordingly to accept angle-off-bore sight or elevation angle measurements rather than azimuth angle measurements.

Figure 1B:
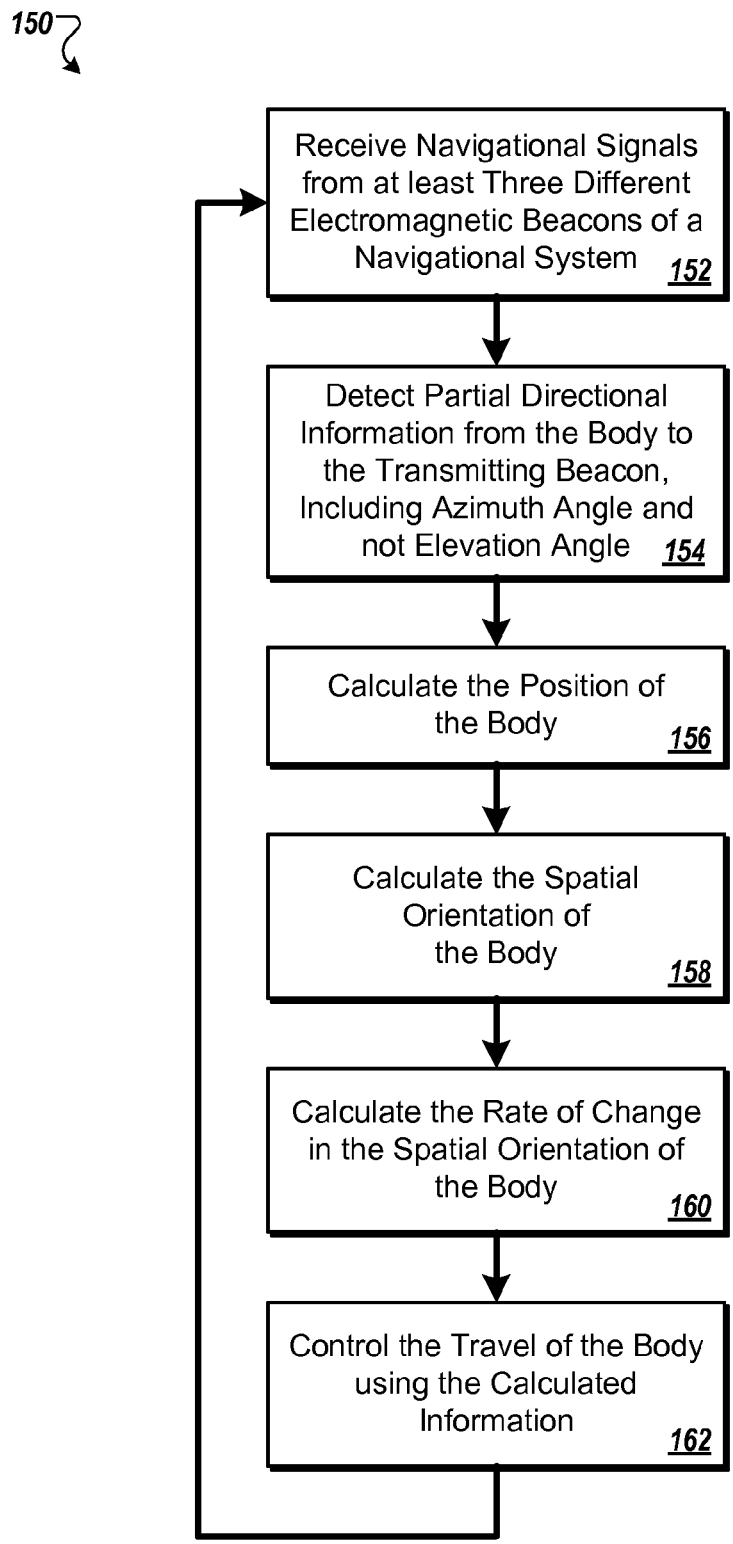
FIG. 1B is a flow chart of an example process for determining spatial orientation information of a body.

FIG. 1B is a flow chart of an example process 150 for determining and using a spatial orientation of a body. The process 150 may be performed in part by the system shown in FIG. 1A. The process 150 begins with receiving navigational signals from at least three different electromagnetic beacons of a navigational system (152), for example, the signals from satellites 106 shown in FIG. 1A. The navigational signals can include an identification of the electromagnetic beacon (to distinguish the different signals received from different satellites) or the position of the electromagnetic beacon within the navigational frame, as well as a timestamp relating the time at which the transmission occurred, based upon a synchronized timing system.

Partial directional information from the body to the transmitting beacon is detected for each of multiple received beacons. The partial directional information may include azimuth angle information and not elevation angle information (154). Alternatively, for example, the partial directional information may include elevation angle information and not azimuth angle information. The partial directional information may be detected, for example, by the direction finding component 118 of FIG. 1A. The partial directional information can be determined using a directional transducer and receiver system. In some implementations, the directional transducer can be a physically rotating antenna or antenna array or an antenna array electrically rotated. In some examples, an array of antenna elements can be electrically rotated by varying the phase of the exciting current in each of the elements of the array, and in so doing "rotating" the direction of receiving sensitivity of the array, or by applying a particular phase shift to the exciting current, and applying the exciting current to each antenna element in turn to rotate the directionality of the antenna array. The directional transducer, for example, may be too simple or inexpensive to properly detect elevation information.

Next, the position of the body is calculated (156). This may be done, for example, by the receiver of FIG. 1A. Using the known locations of the sources of the electromagnetic beacons, for example as determined from information provided in the transmissions, the distance to the electromagnetic beacons can be calculated using time stamp information provided by the electromagnetic beacons and time-of-receipt information, as determined using a synchronized timing mechanism. Using the distance between the three or more electromagnetic beacons and the body, the position of the body within the navigational frame can be calculated. For example, the capability to calculate the longitude, latitude and height of the body can be provided by a standard GPS receiver.

The spatial orientation of the body is next calculated (158). This may be done, for example, by the body state estimator 108 of FIG. 1A. The detected partial directional information, the calculated position of the body, and the determined positions of the electromagnetic beacons can be used to calculate the spatial orientation of the body. The details of example calculations to obtain the spatial orientation are described in detail later in this document.

The rate of change of the spatial orientation of the body is calculated (160). Based upon the spatial orientation calculation and detected rate of change of azimuth angle information (or alternatively, elevation angle information), the rate of change of spatial orientation can be calculated. The details of how this may be calculated are described in detail later in this document. This rate of change information may be stored in memory, for example in repository 110 of FIG. 1A, for later use.

Next, the travel of the body is controlled using the calculated information (162). The calculations for the position, spatial orientation, and rate of change of spatial orientation can be used to actively correct the course of the body or to provide feedback to an operator controlling the course of the body. The control of the body may be performed using the information stored, for example, in repository 110 of FIG. 1A. For example, this stored information may serve as inputs to an on-board computer-controlled navigation system, and/or may be used to generate a visual display for a user.

Traditionally, inertial sensors such as motion sensors (e.g., accelerometers) and/or rotation sensors (e.g., gyroscopes) have been employed to determine the orientation of a body as well as, optionally, the body velocity (e.g., direction and speed of movement). Many navigational systems employ GPS as well as inertial sensors, such as gyroscopes or accelerometers, to determine the six degrees of freedom (6DOF) of a body. These systems may be referred to as integrated GPS/inertial (GPSI) systems. The GPS readings can be used to correct or calibrate readings provided by the Inertial Navigation System (INS). For example, GPS calculations can be used to bound navigation errors occurring due to drift within the inertial sensors. The calculated spatial orientation and rate of change of spatial orientation can, in some implementations, be fed back to the system to bound inertial sensor navigation errors.

Figure 3A:
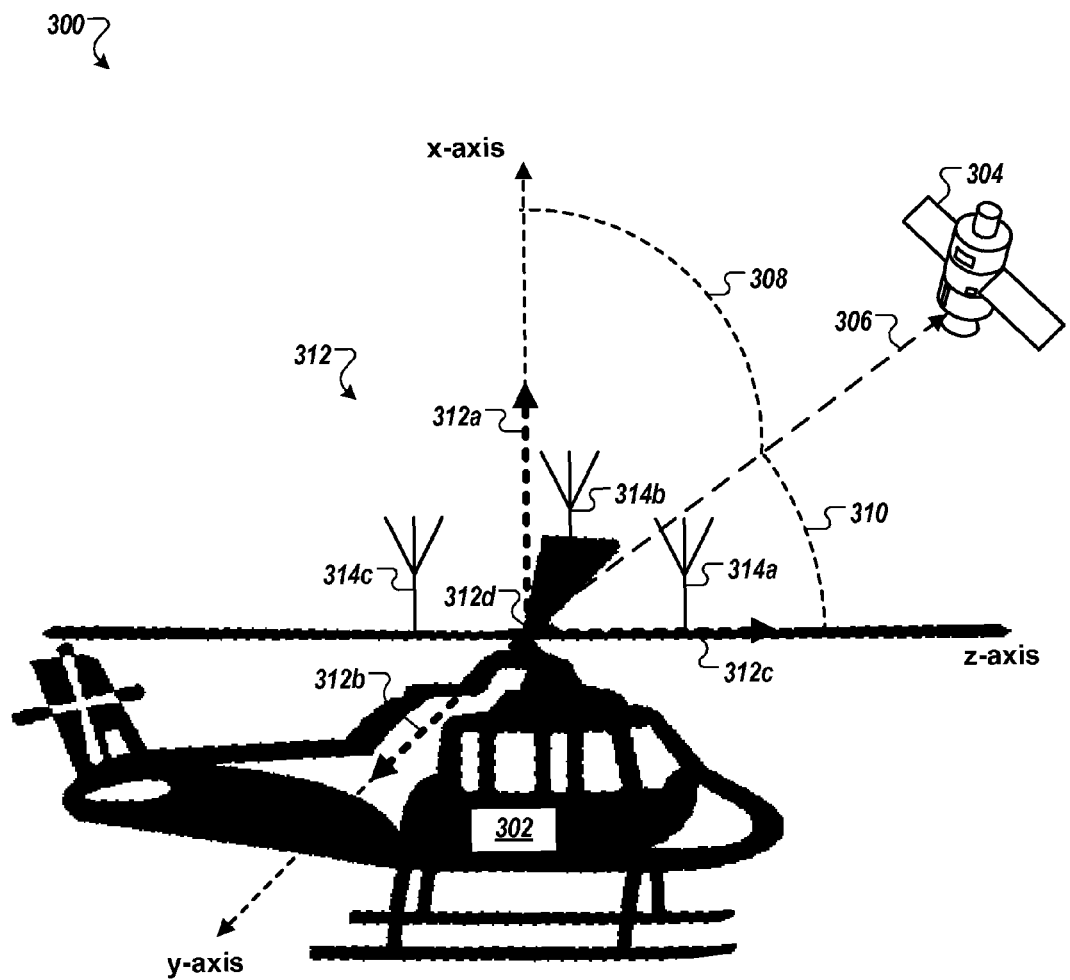
FIG. 3A is a diagram of a traveling body (helicopter) and a satellite of a satellite navigation system, illustrating angles that define a vector from the body to the satellite.

FIG. 3A is an example diagram 300 of a helicopter 302 and a satellite 304, which will be used to illustrate an example body frame 312. FIG. 3A also illustrates a local navigation frame, which assuming yaw, pitch and roll angles all being zero as depicted in FIG. 3A, the local navigation frame would be the same as the body frame 312. FIG. 3A also illustrates a vector 306 from the body (helicopter 302) to the satellite representing a direction from which a line-of-sight transmission from the satellite 304 is received at the body, and angles that define the directional vector 306 in relation to the local navigation frame 312.

The body frame (and local navigation frame) for the helicopter in this illustration is similar to the example aircraft body frame example discussed previously, and includes a z-axis 312c that is parallel with a forward facing direction of the helicopter, an x-axis 312a that extends up and down through the center of the helicopter and that is perpendicular to the z-axis 312c, and a y-axis that extends from side-to-side and through the center of the helicopter perpendicular to both the x-axis 312a and the z-axis 312c. The center point 312d of the body frame at which the three axes intersect is at the center of the rotor blades.

The vector 306 from the center of the body frame 312d to the satellite 304 may be defined in relation to the local navigation frame in different ways. For example, the vector "r" 306 can be described in the following equivalence in the local navigation frame:

$$r=[rx,ry,rz]$$

a value which can be calculated as the line-of-sight difference between the positions of the beacon 304 and the helicopter 302 furnished, for example, by a GPS receiver within the helicopter 302. If, instead, the vector 306 is considered in relation to the body frame 312 (which may not be in attitude alignment with the local navigation frame), then the coordinates of the satellite 304 can be described using the following equivalence:

$$rb=[rbx,rby,rbz]$$

relative to the body frame axes. Determining the spatial orientation of the body includes solving the transformation between the coordinates for r and the coordinates of rb. In prior art, a specialized sensor (for example, a 2DOF directional antenna) could be added to the helicopter 302, for example, which may be able to measure the quantity rb, the vector measurement in the body frame 312, as related to the satellite 304. The transformation may then be determined using the vector measurements for two different satellites.

In the prior art, a vector from the helicopter 302 to the satellite 304 could be described definitively using three angles, one angle from each of the three axes (x, y, and z), assuming the antenna system was of a type capable of detecting the three angles. In one example, consider the vector 306 as being a unit vector. As shown in FIG. 3A, for a unit vector rb 306, the vector direction from the body frame 312 of the helicopter 302 toward the satellite 304 is equivalent to three direction cosine angles. There is a first "boresight" angle gamma_x 308 between a body frame x-axis 312a of the helicopter 302 and the satellite 304, and a second "boresight" angle gamma_z 310 between the body frame z-axis 312c and the satellite 304. The third direction cosine angle gamma_y angle is the boresight angle taken with respect to the body frame y-axis 312b, which angle is not illustrated due to the perspective of FIG. 3A.

Beginning with the boresight angle gamma_x 308, the following equivalence can be used to describe its relation with the body frame x-axis 312a:

$$rbx=\cos(gamma\_x)$$

If gamma_x is equal to zero, then the body frame x-axis 312a is pointed directly at the satellite 304. Otherwise, the satellite 304 lies off axis.

The second angle, as previously mentioned, can be gamma_y or gamma_z 310, depending on whether the angle is measured with respect to the body frame y-axis 312b or the body frame z-axis 312c. These options can be described using the following equivalences, also known as direction cosines:

$$rby=\cos(gamma\_y)$$

$$rbz=\cos(gamma\_z)$$

A method of fully defining the direction vector 306 from a body to a beacon, that is equivalent to measuring the three direction cosines, is measuring both an "elevation" angle and an "azimuth" angle relative to any designated one of the body frame axes 312a, 312b, or 312c. Any non-zero vector, such as the body frame x-axis 312a, can determine a unique "normal" two-dimensional (2D) plane consisting of all the vectors from the center of the body frame 312 that are perpendicular to the body frame x-axis 312a. In particular, the body frame y-axis 312b and the body frame z-axis 312c are contained in the horizontal normal plane. Using the body frame 312, given any 3-vector in space that is not in the direction of the body frame x-axis 312a, such as the vector rb 306, there is an "elevation" angle between the vector 306 and the 2D horizontal normal plane.

In FIG. 3A, the elevation angle for satellite 304 appears to be the same "boresight" angle gamma_z 310 due to the 2D perspective of the drawing showing vector 306 directly above the z-axis 312c. More generally, in a different perspective drawing, it may occur that the vector 306 is also rotated away from the z-axis 312c through an "azimuth" angle around the x-axis 312a, causing the boresight angle gamma_z 310 to be larger than the elevation angle above the horizontal plane.

The helicopter 302 has an array of antennas 314a, 314b, and 314c arranged on the rotor blades of the helicopter. The antenna array receives transmissions from a satellite navigation system, including the satellite 304, which would be one of several satellites of the navigation system (the others not shown in FIG. 3A). There may be more or fewer components of the antenna array than is shown in FIG. 3A, for example, the number of antenna array components may correspond directly to the number of rotor blades. The antennas rotate as the rotor blades rotate, and thus the antenna array has directional antenna capabilities.

Figure 3B:
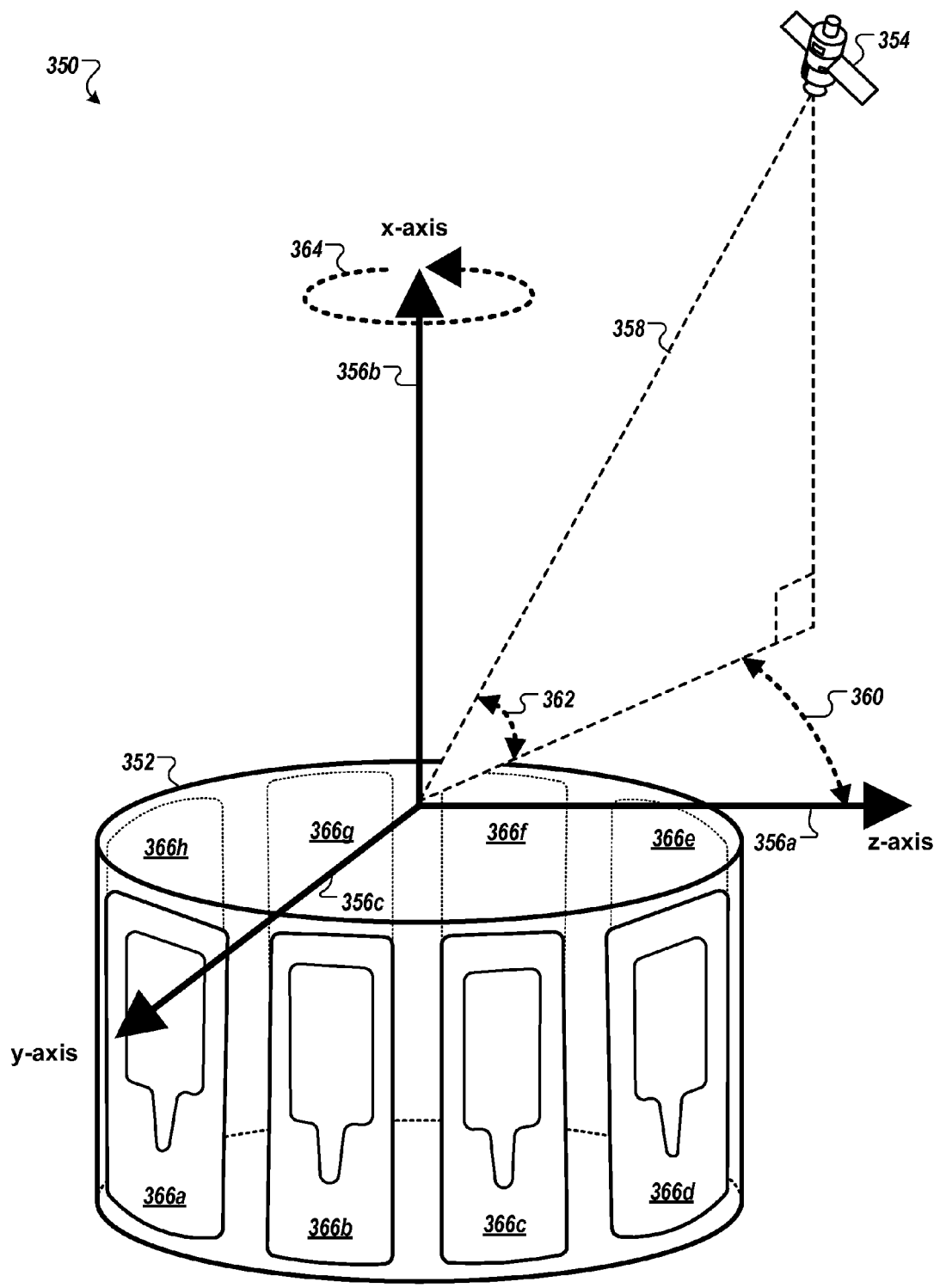
FIG. 3B is a diagram of a satellite and an example antenna operable to detect azimuth angle information.

As shown in FIG. 3B, a cylindrical antenna array 352 with a body frame 356 receives a transmission from an electromagnetic beacon 354 along a transmission vector 358. The transmission vector 358 can be defined by an azimuth angle 360 related to the offset of the transmission vector 358 from a body frame z-axis 356a and an elevation angle 362 related to the angle between the transmission vector 358 and a plane containing the z-axis 356a and a y-axis 356c.

Returning to FIG. 3A, the vector 306 can thus be equivalently defined in terms of either three direction cosine angles or in terms of an azimuth angle and an elevation angle. Note that the selection of the vertical x-axis 312a for determining azimuth angles is motivated by the horizontal configuration of the antenna array elements 314a, 314b, 314c on the helicopter rotor blades. When the rotor blades are spinning, for example, the physical rotation of the antenna array 314a-c can modulate the electromagnetic signal from the beacon 304 and assist in measuring azimuth angles relative to the x-axis 312a.

Figure 2:
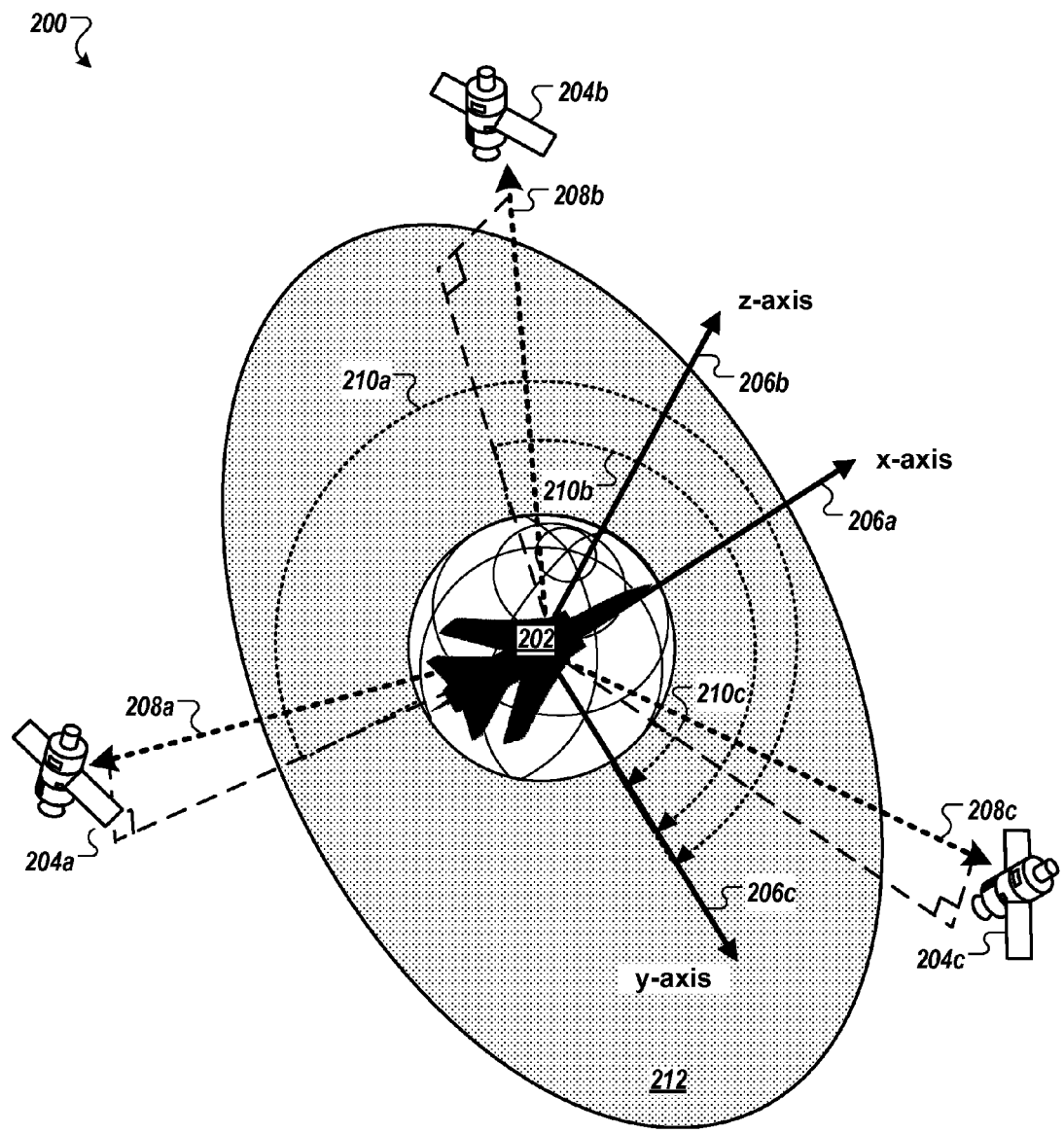
FIG. 2 is a diagram of a satellite navigation system and a traveling body (aircraft), illustrating various defined vectors and angles.

Instead of using specialized sensors for obtaining a precise measurement of the vector directions, an inexpensive estimate of the body orientation may be made using partial directional information, for example, by using only scalar azimuth angle measurements, without requiring measurement of either elevation angles or direction cosines. As shown in FIG. 2, an example diagram 200 illustrates azimuth angle displacements of multiple beacons arranged around a body. An airplane 202 near the surface of the Earth is in communication with a set of three satellites 204a, 204b, and 204c orbiting the Earth. The orientation of the airplane 202 can be described in relation to a body frame 206a-c of the airplane 202. The direction of each of the satellites 204, in general terms, can be described using a set of vector measurements 208a, 208b, and 208c from the center of the body frame 206 to each satellite 204a, 204b, or 204c. However, the orientation of the body frame 206 can be determined simply by measuring the azimuth angles 210a, 210b, 210c. In FIG. 2, the azimuth angles are measured around an x-axis 206a using a y-axis 206c as a reference for zero azimuth angle. The azimuth angles 210a, 210b, 210c can be defined as follows.

Any vector, such as the body frame x-axis 206a, can define a unique "normal" two-dimensional (2D) plane 212 consisting of all the vectors from the center of the body frame 202 that are perpendicular to the body frame x-axis 206a. In other words, the body frame y-axis 206c and the body frame z-axis 206b are contained in the horizontal normal plane 212. Using the body frame 206, given any 3-vector in space that is not in the direction of the body frame x-axis 206a, such as the vector rb 208a, there is another unique 2D plane (not shown in FIG. 2) that contains both the body frame x-axis 206a and the vector rb 208a. This new plane is parallel to the body frame x-axis 206a, and it intersects the normal plane 212 in a line. Thus establishes a correspondence between lines in the normal plane 212 and the planes that are parallel to the body frame x-axis 206a.

There is a 3×3 matrix P called the projection operator for the body frame x-axis 206a, that projects any vector rb into a projected vector P*rb that lies in the normal plane 212 for the body frame x-axis 206a. By definition:

$rb=[rbx,rby,rbz]$

It also follows that:

$P*rb=[0,rby,rbz]$

Since rb is assumed to be a unit vector and, as earlier determined, rbx can be considered to be equivalent to cos(gamma_x), it follows that the length of the projected vector P*rb is equivalent to the sin(gamma_x).

The projected vector P*rb can be described using azimuth displacement angles mu_y 210 and mu_z (not illustrated) with respect to the body frame y-axis 206c and the body frame z-axis 206b, respectively. Note that these angles are not identical to the boresight angle gamma_y or the boresight angle gamma_z 310 (as described in relation to FIG. 3A) because the angles in the normal plane 212 are not the same as angles in 3-space.

Since the body frame y-axis 206c and the body frame z-axis 206b are perpendicular, once mu_y 210 is known, mu_z can easily be derived, since the angles mu_y 210 and mu_z differ by ninety degrees. As such, a focus can be made upon measuring a single angle for each beacon, referred to as the azimuth angle mu_y 210, herein described as the angle of the projected vector P*rb in relation to the body frame y-axis 206c.

Returning to FIG. 2, a first azimuth angle 210a describes the position of a vector projected from the unit vector "r" 208a that extends from the center of the body frame 206 to the first beacon 204a. Similarly, a second azimuth angle 210b describes the position of a vector projected from the unit vector "r" 208b that extends from the center of the body frame 206 to the second beacon 204b, and a third azimuth angle 210c describes the position of a vector projected from the unit vector "r" 208c that extends from the center of the body frame 206 to the third beacon 204c.

It can be convenient in practice to measure the cosines of the azimuth angles mu_y 210 and mu_z (not illustrated), rather than the azimuth angles themselves. The cosines of the azimuth angles mu_y 210 and mu_z can be represented by the following equivalences:

$mv=\cos(mu\_y)$ $mw=\cos(mu\_z)$

In 3-space, the boresight angle gamma_x (not illustrated) with respect to the x-axis 206a can be represented using the following equivalences:

$sgx=\sin(gamma\_x)$ $cgx=\cos(gamma\_x)$

Using the above equivalences, the following can be derived regarding the unit vector (extending from the body frame to the beacon) and the projected vector (describing the direction of the beacon from the body frame in relation to the normal plane 212):

$P*rb=sgx*[0,mv,mw]$ $rb=[cgx,sgx*mv,sgx*mw]$

These equivalences can be used, for example, to construct an algorithm for determining body orientation based upon azimuth angle measurements even though the boresight angle gamma_x has not been measured. The azimuth angle measurements themselves, in some examples, can be determined using specialized sensors (e.g., included in the direction finding module 118 of the receiver 102, as described in relation to FIG. 1). In addition to measuring the azimuth angles between each beacon and the body frame, in some implementations, the sensor(s) can additionally determine the derivative of each azimuth angle, also referred to as the azimuth angle rate.

When determining the azimuth angle measurements, a directional transducer such as a rotatable antenna can be used to determine the azimuth of each beacon from the body position, disregarding the elevation of the beacon in relation to the normal plane. As shown in FIG. 3A, in some implementations, one or more antennas can be mounted upon the rotor blades of a helicopter, the rotation of the blades providing the rotation needed to effect direction finding with the antenna(s). In other implementations, an electrically rotated antenna array can be used to determine azimuth angle measurements. For example, as shown in FIG. 3B, multiple antenna elements 366 can be mounted around the diameter of the cylindrical antenna array 352. The electrical phases of the antenna elements can be adjusted to create directional beams that are sensitive to azimuth angles. Changing the electrical phases can cause a rotation 364 of the directional beams of the cylindrical antenna array 352 around its body frame x-axis 356b. A cylindrical antenna array design can more accurately measure the azimuth angle mu_y 360 than the elevation angle 362. Without using the elevation angle 362, measuring the azimuth angle mu_y 360 provides the required partial information about the direction 358 to the beacon 354. In addition to measuring the azimuth angle mu_y 360, in some implementations the antenna array 352 is also used to measure the rate of change of the azimuth angle mu_y 360 as the body rotates or the beacon 354 moves.

Figure 4:
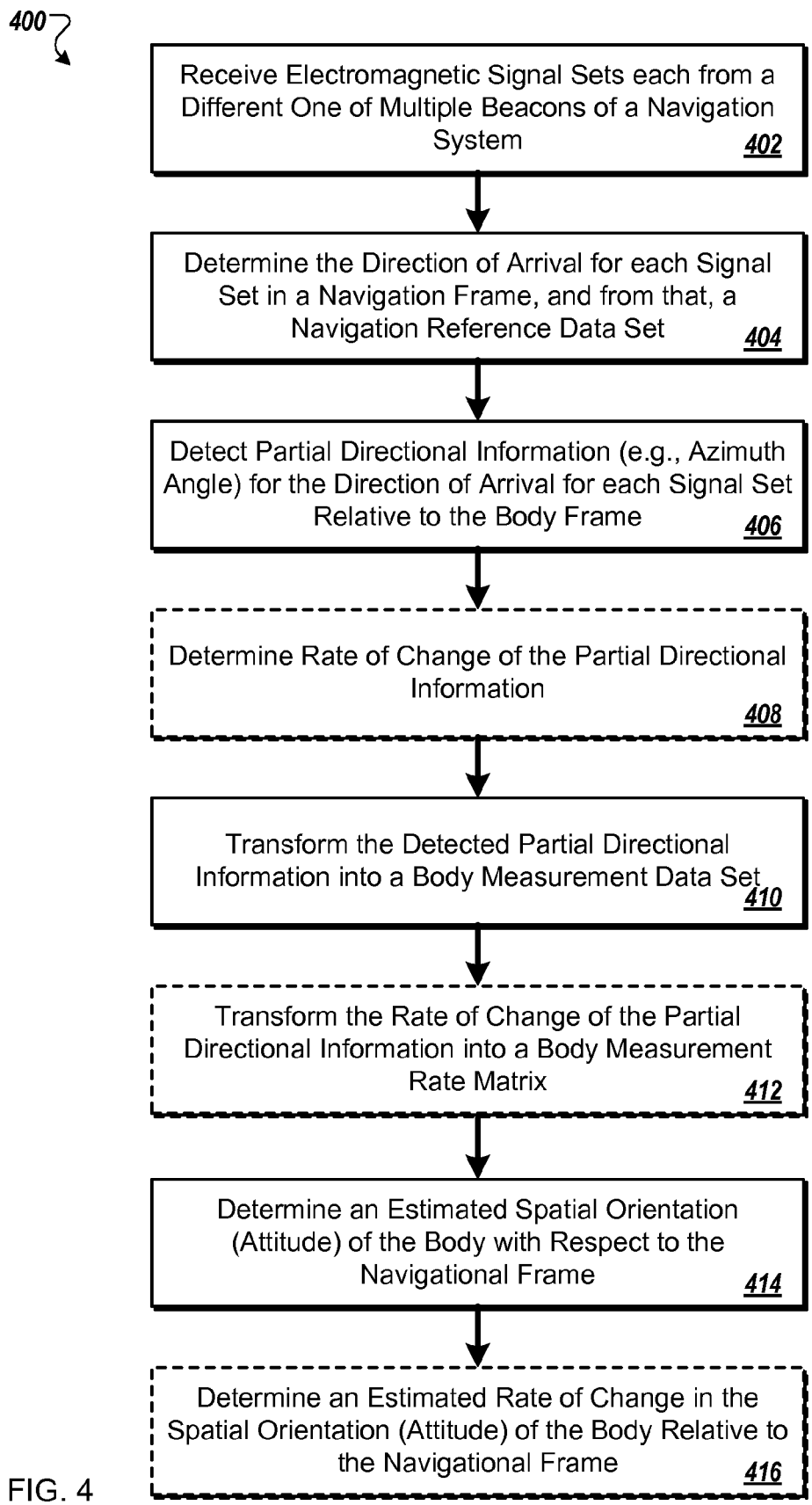
FIG. 4 is a flow chart of an example process for determining spatial orientation information of a body.

FIG. 4 is a flow chart of an example process 400 for determining spatial orientation information for a body. Briefly, the process 400 detects azimuth angle information and, optionally, rate of change of azimuth angle information related to three or more electromagnetic signal sets, each set originating from a different one of multiple beacons of a navigational system. Based upon the detected azimuth angle information, and not also requiring the detection of elevation angle information, the spatial orientation of the body can be estimated. Also, using the rate of change of the detected azimuth angle information, the angular velocity of the body can additionally be estimated. The process 400, in some examples, can be executed by the receiver 102 and the 6DOF body state estimator 108, as described in relation to FIG. 1.

The process 400 begins with receiving electromagnetic signal sets each from a different one of multiple beacons of a navigational system (402). Three or more beacons in communication range of a body, for example, communicate electromagnetic signal sets which can be translated to determine the navigation direction or known position of each beacon, the beacons being at different positions relative to each other (e.g., not within a single line in relation to the body).

The electromagnetic signal sets can be received by a directional transducer such as a rotatable antenna. In a first example, the rotatable antenna can include one or more antennas positioned within a spinning body (e.g., missile or other projectile), such as a small microwave patch antenna mounted within and stationary in relation to the spinning body. In a second example, an antenna or antenna array can be physically rotated around an axis with a defined orientation relative to the body (e.g., mounted on a rotating turntable within or upon the body, mounted on the rotor of a helicopter, etc.). In a third example, the antenna pattern of an antenna array can be electrically rotated by causing the amplitude or phase of the antenna pattern to be rotated around an axis.

The electromagnetic signal sets can arrive from a beacon within line-of-sight communication with the body, or the signal can be transferred to the body in a manner which allows the body to understand the navigation direction of the signal. In some examples, the electromagnetic signal sets can be arriving from communication satellites such as GPS or GLONASS navigational satellites or land or water-based radio frequency beacons. In some implementations, the three beacons and the body are preferably not all within a single plane.

In some implementations, the electromagnetic signal sets include information regarding the exact position of the beacon, referred to as ephemeris data. In some examples, the ephemeris data can be derived through GPS format, Ephemerides of the Planets and the Moon (EPM) format (developed by the Russian Institute for Applied Astronomy of the Russian Academy of Sciences), or Integration Numérique Planétaire de l'Observatoire de Paris (INPOP) format (developed by the Institut de Mecanique Celeste et de Calcul des Ephemerides of France). A receiver within the body, in some implementations, can contain information which can be used to derive the known position or navigation direction of the beacon, such as by using a beacon identification code communicated to the body within the electromagnetic signal set.

The direction of arrival of each electromagnetic signal set is transformed into a navigation reference data set (404). For example, based upon the electromagnetic signal sets, a receiver within the body can determine the position of the body (e.g., navigational coordinates of the center of the body frame) in relation to the known navigation frame. The reference data set, in some implementations, can additionally include a velocity of the body. The reference data set, in some examples, can be determined using standard GPS demodulation and processing methods.

Azimuth angle information is detected for each electromagnetic signal set (406). For example, the direction of a projected vector of the beacon in relation to a normal plane consisting of the body frame y- and z-axes can be detected by sampling the electromagnetic signal being communicated by the beacon to determine the point of peak signal amplitude. For example, a directional transducer such as a rotatable antenna can be used to determine the direction in which each beacon exhibits the point of peak signal amplitude. In some implementations, a specialized sensor within the receiver of the body can measure the azimuth angle or the cosine of the azimuth angle relative to the body frame.

Optionally, the rate of change of the azimuth angle information is measured for each electromagnetic signal set (408). For example, the azimuth rate of the beacon can be determined by measuring the alignment times for each beacon tracked by the receiver system and calculating a weighted sum of all of the collected alignment times.

The rate at which the azimuth angle information is changing can be determined by processing multiple azimuth angle measurements in relation to time within the receiver. In some implementations, the receiver within the body can report measurements at five hertz or faster. The measurement period, in some implementations, can be determined based in part upon the nature of the body. The determination of the rate of change of the orientation of a spinning body may require a shorter measurement period, for example, so that high frequency coning motions can be calculated with reasonable accuracy.

To generate a valid estimation, in some implementations, the same number of measurements can be compiled for each beacon tracked (e.g., three or more GPS satellites). For example, if a particular measurement associated with a particular beacon is missed due to a communications problem, that beacon may be dropped from the calculation process when determining the rate of change of azimuth angle information.

The rate of change (mu_ydot) of the azimuth angle (mu_y) can be defined by the following equivalences:

$$mvdot=-\sin(mu\_y)*mu\_ydot$$

$$mwdot=-\sin(mu\_z)*mu\_zdot$$

The detected azimuth angle information is transformed into a body measurement data set (410). Beginning with the azimuth angle measurements, the cosines of the azimuth angles can be represented by the following equivalences:

$$mv=\cos(mu\_y)$$

$$mw=\cos(mu\_z)$$

The values mv and mw can be provided to the body state estimation module from the receiver or, alternatively, can be calculated by the body state estimation module based upon provided azimuth angle information. In general, the format of the body measurement data set depends on how the body orientation will be described in a particular implementation. In some implementations, a three-by-three rotation matrix A, such as a direction cosine matrix (DCM), can describe the transformation from vectors expressed in the navigation frame to vectors expressed in the body frame. Another way of representing the body orientation is through a single four-vector called a quaternion, mathematically represented as follows:

$$e=[e0,e1,e2,e3]$$

The three Euler angles, in some implementations, can be directly manipulated, for example using a Newton method. Some switching between matrix calculations and Euler angle calculations, in some implementations, can be done while solving for spatial orientation as any of the above mentioned methods can be viewed as substantially equivalent.

If the rate of change of the azimuth angle information was measured at (408), the rate of change of azimuth angle information is transformed into a body measurement rate matrix (412). In general, the format of the body measurement rate data set depends on how the body rates will be described in a particular implementation. In some implementations, the magnitude of the angular velocity vector can be used to specify the rate of rotation, for example, in complete cycles per second (e.g., Hertz), or mathematical radians per second. In the body frame, three components [p, q, r] can represent the combined rates of rotation of the body around the instantaneous position of the body axes.

A linear relationship exists between the derivatives of the Euler angles, described by the following equivalence:

$$eulerdot=[yawdot,pitchdot,rolldot]$$

and the pqr components of the angular velocity. A three-by-three matrix M1 can be constructed using terms of the trigonometric functions of the Euler angles (e.g., yaw, pitch, and roll) such that the following linear equation holds:

$$eulerdot=M1*[p,q,r]$$

In another example, the derivative of the quaternion 4-vector:

$$edot=[e0dot,e1dot,e2dot,e3dot]$$

can also be related to the [p,q,r] three-vector using a four-by-three matrix M2 exhibiting the following linear relationship:

$$edot=M2*[p,q,r]$$

The entries in the matrix M2, for example, can be derived from the components of the quaternion e in a similar manner as the entries of the matrix M1 depended on the Euler angles. Some switching between quaternion derivatives, Euler angle derivatives, and angular velocities can be done during calculations while solving for angular body rates as any of the above mentioned methods can be viewed as substantially equivalent.

The spatial orientation of the body frame with respect to the known navigation frame is determined (414). The available information is contained in the body measurement data set and the navigation data set. The body measurement data set includes the cosines mv and mw for the azimuth angles. The body measurement data set does not include elevation angle information for the beacon (which is equivalent to the boresight angle gamma_x). The determination of the spatial orientation proceeds with partial information about the direction cosine vector rb defined by the equivalence:

$$rb=[cgx,sgx*mv,sgx*mw]$$

where the cosine cgx and sine sgx of gamma_x are not yet known. The navigation data set does include coordinates for the direction cosine vectors of the beacons expressed in the navigation frame. These known navigation vectors are defined herein as:

$$r=[rx,ry,rz]$$

For example, the body spatial orientation relative to the navigation frame can be described by some unknown DCM A that can be used in the following equivalence:

$$rb=A*r$$

Both the DCM A and the boresight angle gamma_x are unknown variables that can be found to determine the spatial orientation of the body frame. This is solved by minimizing a cost function J(A). The cost function J(A) can be generated using the weighted sum of all of the lengths (squared) of the error vectors represented by the following equation:

$$err=rb-A*r$$

Because the components of the vector rb are related to the azimuth angle measurements, a scalar optimization problem can be iteratively solved to estimate the body spatial orientation. The optimization produces a three-by-three DCM A that transforms from local navigation coordinates to body frame coordinates and estimates the unknown boresight angle gamma_x for each beacon. In some implementations, due to measurement errors and uncertainties, each measurement contribution to the solution can be weighted according to an estimation of the accuracy of the measurement. For example, the greater the number of measurements taken (e.g., measurements related to four or more beacons), the greater the accuracy which can be achieved.

If the body measurement rate matrix was formed (410), an approximation of the angular velocity of the body frame is iteratively refined (416). First an estimation of the angular velocity of the body frame can be initialized. The value used for initialization can vary, depending upon on the circumstances of the body. For example, if the body is known to be a spinning projectile, the angular velocity of the body frame may be initialized to a large rate. In another example, if the body is an airplane or helicopter beginning its flight pattern, the angular velocity of the body frame may be initialized based upon the vehicle acceleration. If previous estimates of the angular velocity of the body frame have been calculated, the initialization can be based in part upon a previous calculation.

The initialized value can be used for estimating a DCM, Euler angle, or quaternion derivative. The rate matrices (e.g., eulerdot or edot as described above) related to measurements taken from each of the beacons can be iteratively refined. The angular velocity of the body frame can then be calculated from the DCM, Euler angle, or quaternion derivative.

To check the accuracy of the angular velocity estimation, a quadratic error value can be calculated. If this is not the first time performing the estimation iteration, the quadratic error value can be compared to the previously calculated quadratic error value to determine whether or not the estimation has achieved a desired degree of accuracy. If the comparison fails, the iteration process can continue with estimating the DCM, Euler angle, or quaternion derivative.

In some implementations, the iterations can continue until the quadratic error value comparison determines that the current quadratic error value is equal to the previous quadratic error value for at least a predefined number of significant digits (e.g., 3, 4, or 6). The iterations may be discontinued, in some implementations, after a certain number of iterations or a certain amount of time has lapsed. For example, iterating on the angular velocity estimation can be cut short due to new measurements being available or to limit power consumption.

More or fewer steps can be included within the process 400, and some of the steps may be performed in a different sequence than those described. In some implementations, in addition to the rate of change, the rate of acceleration may be estimated. In some implementations, the position and velocity of the body is not calculated. For example, if the beacons are stationary, such as cellular telephone towers, and the position of the body is not desired, the process 400 can ignore position and velocity information, only calculating information related to the spatial orientation of the body. This may be applicable, for example, when providing heading information to an operator within a graphical display.

Figure 5:
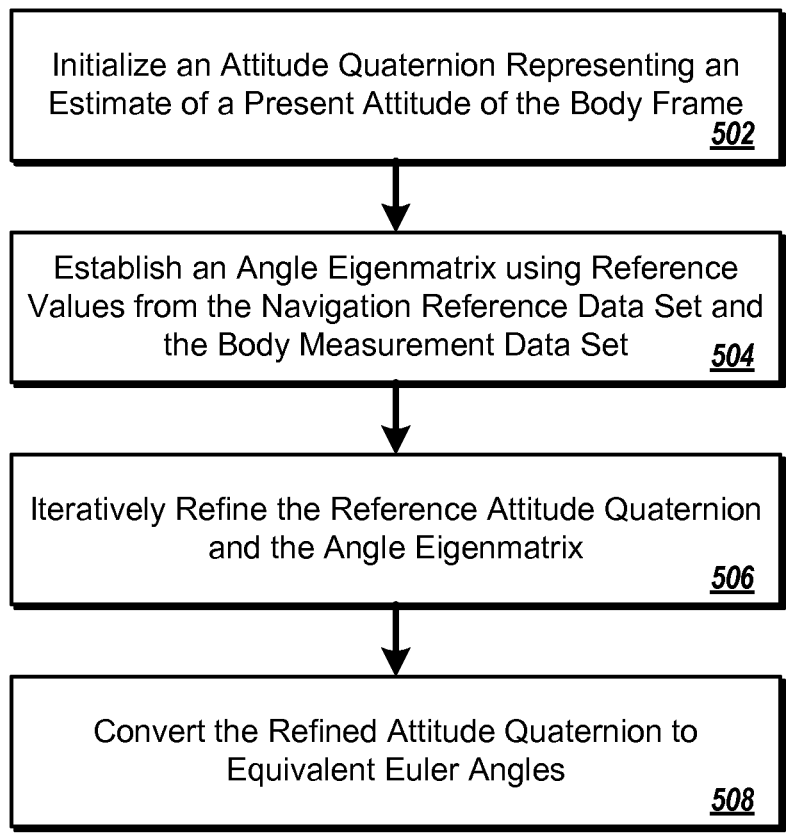
FIG. 5 is a flow chart of an example process for determining spatial orientation information of a body from azimuth angle information using quaternions.

FIG. 5 is a flow chart of an example process 500 for determining a spatial orientation of a body from azimuth angle information using quaternions. Briefly, the information available to the process 500 can include the body measurement data set and the body navigation reference data sets, including the information related to the variables mw, mv, rb, and r as described in relation to FIG. 4. The body navigation reference data sets, for example, can include N navigation vectors, defined within in the body frame, the navigation vector components arranged in a three-by-N matrix R (e.g., the columns being the N navigation vectors). When determining the rank of the matrix R, it may be assumed that at least three of the navigation vectors are linearly independent. This is typical, for example, when using GPS satellites. As used herein, an apostrophe within an equation or equivalence refers to taking the transpose of a vector or matrix.

The goal of the process 500 is to determine the three-by-three direction cosine matrix (DCM) A that can be used to transform known navigation frame coordinates to body frame coordinates. If the coordinates of the body frame could be written as vectors in the known navigation frame, three different vectors u, v, and w could be used to define the xyz body frame axes as three-by-one column vectors in the known navigation frame. As follows, the DCM can be defined as a three-by-three matrix:

$$A = [u', v', w']$$

where the rows are the components of the three-by-one column vectors transposed to row vectors.

For each navigation vector r, $$rb = A*r = [u'*r, v'*r, w'*r]$$

can be represented as a three-by-one column vector.

As described in relation to FIG. 3A, in three-space, the boresight angle gamma_x can be represented using the following equivalences:

$$sgx = \sin(gamma\_x)$$

$$cgx = \cos(gamma\_x)$$

Using the boresight angle gamma_x, the error vector can be represented as follows:

$$err = rb - A*r = [cgx - u'*r, sgx*mv - v'*r, sgx*mw - w'*r]$$

At this point, the navigation vectors r, azimuth angle cosine measurement mv, and azimuth angle cosine measurement mw are known values.

The process 500 begins with initializing an attitude quaternion representing an estimate of a present attitude of the body frame (502). With the problem recast in terms of quaternions, it may be recognized that there are three independent unknown quantities in the unit quaternion e. Returning to the cost function J(A) introduced in relation to FIG. 4, a revised cost function J(A(e)) can be defined as a function of the unknown quaternion e, the known navigation vectors r, and the known azimuth angle cosine measurements mv and mw.

The optimization problem results in an eigenvector problem of the following form:

$$H*e = lambda*e$$

where e is the quaternion and H is a four-by-four angle eigenmatrix H derived from the vector measurements rb.

The angle eigenmatrix H is unknown, being dependent upon the unknown boresight angles gamma_x as well as the known azimuth angle cosine measurements mv and mw. Using the scalar measurements, the angle eigenmatrix H can be simultaneously estimated while solving the eigenvector problem to determine the quaternion e, starting with approximate values for the boresight angles gamma_x.

Minimizing J(A(e)) proves to be the same as minimizing the scalar quantity:

$$J(e) = (sgx - e'*Hm*e)^2$$

for a known four-by-four matrix Hm that depends solely on the components of the navigation vector r and the azimuth angle cosine measurements mv and mw. The cost function J(e) depends explicitly on the unknown parameter sgx, but the value of sgx implicitly depends on e. This derives a quadratically constrained quadratic problem, and when adjoining the Lagrange multiplier to maintain the constraint that e is a unit quaternion, and differentiating with respect to the quaternion components, an eigenvector problem results:

$$(H - lambda*I)*q = 0$$

The eigenmatrix H implicitly depends on the parameter sgx. This eigenvector problem may be solved by four eigenvectors q with four different eigenvalues lambda. The desired attitude quaternion e, in this example, is the eigenvector q with the largest eigenvalue lambda for the correct parameter sgx.

Given an estimate for the parameter sgz, an angle eigenmatrix H is established using reference values from the navigation reference data set and the body measurement data set (504). Three four-by-four matrices Hu, Hy and Hw that depend solely on the known navigation vectors r can be defined, demonstrating how the angle eigenmatrix H also depends on the unknown boresight angle gamma_x and the measured cosines mv and mw. The angle eigenmatrix H explicitly depends on the cotangent of the boresight angle gamma_x:

$$ctn = \frac{cgx}{sgx}$$

Specifically, the angle eigenmatrix H conforms to the following equivalences:

$$H = mv^*Hv + mw^*Hw + ctn^*Hu$$

These four-by-four matrices can be obtained for each navigation vector r. To correctly pose the eigenvalue problem, a sum (or, optionally, a weighted sum) of the contributions for all N of the navigation vectors r can be formed. Data for at least three beacons, for example, may be required to determine a unique solution. In some implementations, the contribution for any navigation vector r with a small boresight angle gamma_x can be discounted because the cotangent is unbounded. Thus, even if N different angle eigenmatrices are being measured and tracked, only those angle eigenmatrices in which the azimuth angle cosine measurements mv and mw appear to be reliable and the boresight angle gamma_x is not too small may be used when calculating the least squares solution.

When applying this algorithm, for example, in MatLab, the following computations can be used to establish the angle eigenmatrices and initialize the attitude quaternion e.

First, storage for all four-by-four matrices (e.g., Hu, Hv, Hw) for all N navigation vectors r can be initialized:

$$Hur = zeros(N,4,4);$$

$$Hvr = zeros(N,4,4);$$

$$Hwr = zeros(N,4,4);$$

Next, matrices can be defined for each navigation vector r (1 through N).

Vector components and the cosine measurements can be extracted from the navigation vector components arranged in the three-by-N matrix R:

$$rx = R(1,i);$$

$$ry = R(2,i);$$

$$rz = R(3,i);$$

A matrix Hur for the projection of navigation vectors r onto u can be computed:

$$Hu = \begin{bmatrix} rx & 0 & -rz & ry \\ 0 & rx & ry & rz \\ -rz & ry & -rx & 0 \\ ry & rz & 0 & -rx \end{bmatrix}$$

$$Hur(i,:,:) = Hu(:,:);$$

A matrix Hvr for projection of r onto v can be computed:

$$Hv = \begin{bmatrix} ry & rz & 0 & -rx \\ rz & -ry & rx & 0 \\ 0 & rx & rz & -ry \\ -rx & 0 & rz & -ry \end{bmatrix}$$

$$Hvr(i,:,:) = Hv(:,:);$$

A matrix Hwr for projection of r onto w can be computed:

$$Hw = \begin{bmatrix} rz & -ry & rx & 0 \\ -ry & -rz & 0 & rx \\ rx & 0 & -rz & ry \\ 0 & rx & ry & rz \end{bmatrix}$$

$$Hwr(i,:,:) = Hw(:,:);$$

The navigation matrices, for example, can be computed just a single time since they depend solely on the navigation vectors r in the matrix R. The navigation matrices can then be used in the following algorithms.

The reference attitude quaternion and the angle eigenmatrix are iteratively refined (506). The core of the algorithm to compute the quaternion e includes an iterative process that refines an initial approximation of the quaternion e. Each time the iteration is performed, for example, the previous computation of the quaternion e becomes refined to provide a better approximation to the final quaternion e. The process can be repeated any number of times, but there can come a point where the estimate becomes dominated by the measurement errors.

Variations of the quaternion refining algorithm can include, for example, different approaches for defining the initial estimate q for the quaternion e. In general, anything that may be known about the approximate orientation of the body frame relative to the local navigation frame can be embedded in the initial estimate for q. This can include, in some examples, sensor measurements, initial path information regarding the vehicle, previously calculated spatial orientation estimates, or other measured or calculated estimations regarding the position, orientation, velocity, or acceleration of the body. Using the quaternion method example, just as the quaternion e is defined as a unit four-vector, each approximation q can be represented by a unit 4 four-vector.

In the iterative algorithm example following, contributions have not been weighted for the sake of simplicity. In other implementations, individual contributions can be weighted.

The estimated quaternion q can be used to estimate the cotangents for all of the boresight angles gamma_x by first extracting the vector components of the estimated quaternion e:

$$q = [q0, qx, qy, qz]$$

Next, the local navigation frame coordinates of the body x-axis vector u can be formed:

$$u = [qx^2 + q0^2 - qy^2 - qz^2, 2^*(qx^*qy + qz^*e0, 2^*(qx^*qz - qy^*q0)]$$

Then the cosines, sines, and cotangents of the boresight angles gamma_x formed by the body frame x-axis u and the known navigation vectors r can be estimated, as follows:

$$\cos = u' * R$$
$$\sin = \sqrt{(1 - \cos.^2)}$$
$$ctn = \frac{\cos.}{\sin}$$

The cotangent estimates can now be used to recompute a four-by-four angle eigenmatrix H.

The four-by-four angle eigenmatrices Hu, Hv, Hw and H can be initialized as follows:

$Hu$=zeros(4,4);

$Hv$=zeros(4,4);

$Hw$=zeros(4,4);

$H$=zeros(4,4);

The angle eigenmatrix H can be computed by adding up the (weighted) contributions from the N navigation vectors r by looping over all of the navigation vectors r (i=1:N):

(1) the angle eigenmatrices for vector r are extracted:

$Hu(:,:)=Hur(i,:,:)$;

$Hv(:,:)=Hvr(i,:,:)$;

$Hw(:,:)=Hwr(i,:,:)$;

(2) the cosine azimuth angle measurements for navigation vector r are extracted:

$mv=Mv(1,i)$ $mw=Mw(1,i)$ (3) The contribution for navigation vector r is added to the angle eigenmatrix H:

$H=H+mv*Hv+mw*Hw+Ctnq(i)*Hu$

The quaternion estimate q can now be improved and renormalized using the angle eigenmatrix H:

$$q = H * q$$
$$q = \frac{q}{\|q\|}$$

This results in a new unit quaternion q that provides a better approximation of the actual attitude quaternion e than the initial quaternion estimate q. After a number of iterations including estimating the cotangents for all the boresight angles gamma_x using the estimated quaternion q, recomputing the angle eigenmatrix H using the cotangent estimates, and improving and renormalizing the resultant quaternion estimate q, the final quaternion estimate q should be a reasonable approximation for the attitude quaternion e.

In some implementations, the iterations are repeated until the quadratic error function ceases to substantially improve. If the actual precise measurements for the attitude quaternion e were known, then the quadratic error function would be identically zero for each navigation vector r:

$J(e)=(sgx-e'*Hm*e)^2=0$

Based upon this, iterations can be stopped when the given measurement data available does not appear to be improving the quadratic error estimate. If more accurate cosine measurements become available at a later time, for example, iterations can be renewed.

The refined attitude quaternion is converted to equivalent yaw, pitch, and roll angles (508). For example, the DCM or the Euler angles of yaw, pitch and roll can be derived from the quaternion estimate q using traditional methods expressing the equivalence between the different representations for the body orientation.

Figure 6:
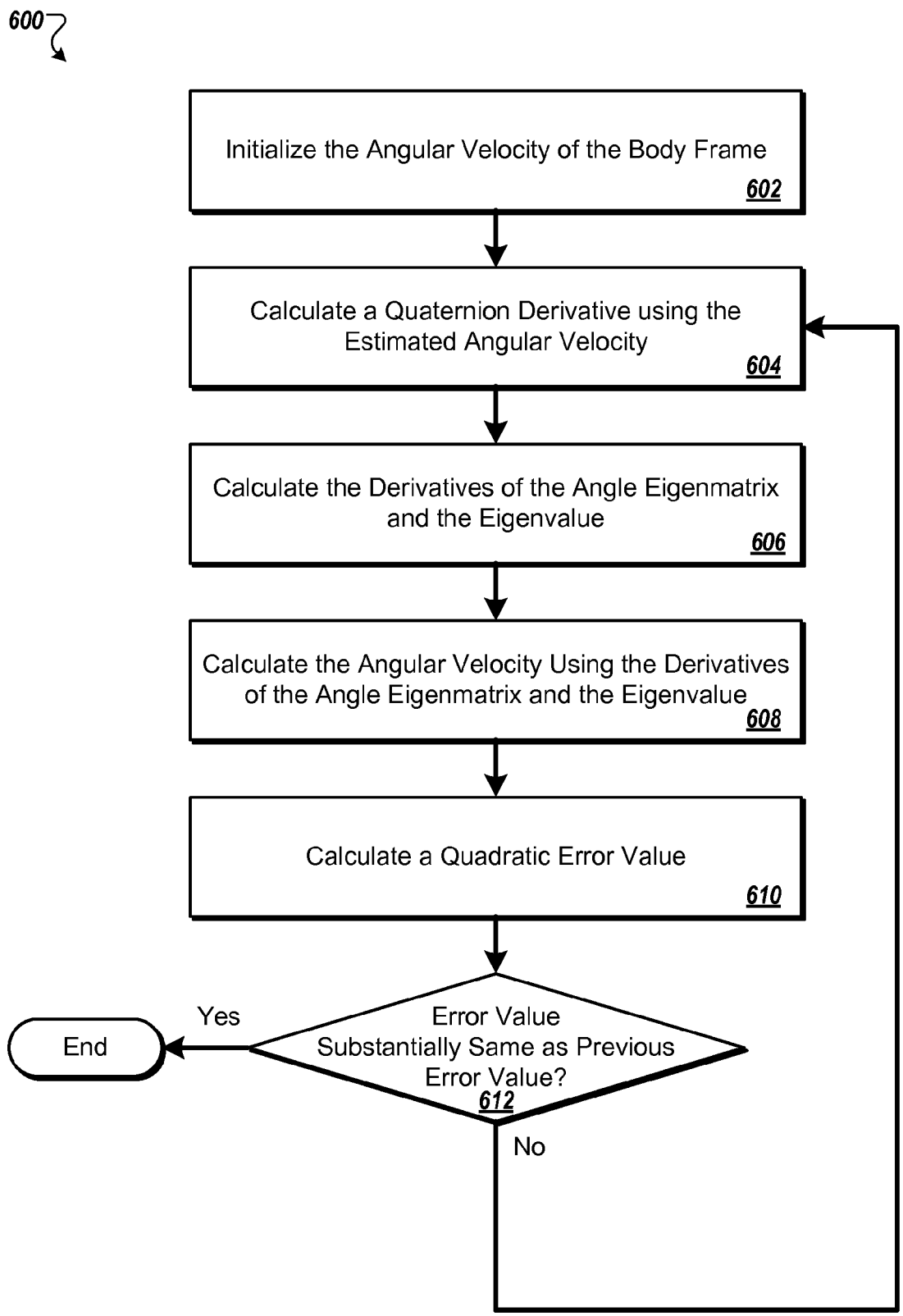
FIG. 6 is a flow chart of an example process for determining the angular rates of a body from azimuth angle rate information using quaternions.

FIG. 6 is a flow chart of an example process 600 for determining the angular rates of a body from azimuth angle rate information using quaternions. Similar to the method described in relation to FIG. 5 pertaining to the quaternion e and the angle eigenmatrix H, the quaternion derivative edot can be calculated given the derivatives of the azimuth angle cosine measurements mvdot and mwdot using a derivative matrix Hdot that depends on the derivatives of the azimuth angle cosine measurements mvdot and mwdot and the boresight angles gamma_x. Unlike the solution for the quaternion e, however, the quaternion derivative edot proves to not be an eigenvector of the derivative matrix Hdot.

In general, to determine the quaternion derivative edot, the eigenvectors of H can be carefully normalized in a manner that permits the quaternion derivative edot to be expressed as linear combinations of the eigenvectors H. In the case of the angle eigenmatrix H, all of the eigenvalues are substantially distinct, and normalization can be carried out easily and efficiently. In some implementations, higher order quaternion derivatives can also be computed from higher order derivatives of the eigenmatrix (e.g., to determine body acceleration) using the following principles.

Assuming perfect measurements, the attitude quaternion e is the eigenvector of the angle eigenmatrix H that corresponds to the eigenvalue lambda. The quaternion e would always satisfy the following eigenvalue equation:

$(H-\text{lambda})*e=0$ where H is the angle eigenmatrix and e is the attitude quaternion described in relation to the eigenvalue lambda in FIG. 5.

Taking the derivative of this equation forms the sum of two terms:

$(H-\text{lambda})*\text{edot}+(H\text{dot}-\text{lambdadot})*e=0$

If Hdot and lambdadot were known, the equation could be solved. Simply define two four-by-four matrices HmL and HmLdot and solve for edot:

$HmL=H-\text{lambda}$ $HmL\text{dot}=H\text{dot}-\text{lambdadot}$ $HmL*\text{edot}=-HmL\text{dot}*e$ Note that HmL is singular and in the direction of the eigenvector quaternion e. However, based upon the quadratic constraint that e'*e=1, it follows by differentiating that edot is perpendicular to e, so there is little concern that edot has a nontrivial component in the direction of e. In other words, edot can be considered as a sum of the other eigenvectors of the angle eigenmatrix H.

To obtain the derivatives of the eigenvalues, the following equation can be differentiated:

$e'*(H-\text{lambda})*e=0$

This results in the following equation:

$\text{lambdadot}=e'*H\text{dot}*e$

Solving for the derivatives of the eigenvalues involves determining Hdot which also depends on edot. Hdot and edot can be obtained at the same time by an iterative approximation method that minimizes the scalar quadratic error function J2(edot):

$$J2(edot)=(HmL*edot-HmLdot*e)^2$$

Begin by assuming that the measured azimuth angle cosine derivatives have been stored in two row vectors (e.g., one-by-N matrices) Mvdot and Mwdot. Also assume that the data calculated during process 500 (see FIG. 5) is available.

The process 600 begins with initializing the angular velocity of the body frame (602). A three-by-one angular velocity vector pqr and other data structures must be initialized before the iterative refinement of the angular velocity begins. The angular velocity vector pqr can be initialized to a reasonable estimate of the angular velocity, for example based upon additional measurements available, a previous estimate, or other information known about the body. In some implementations, the angular velocity vector is initialized to zero.

Other matrices can be initialized using the data described in relation to FIG. 5. Standard matrix techniques can be applied to the angle eigenmatrix H to compute and a four-by-four matrix of eigenvectors X and a diagonal four-by-four matrix of eigenvalues L that satisfy the matrix eigenvalue equation:

$$H*X=L*X$$

The order of the columns of the matrices X and L can be rearranged such that:

$$X(:,4)=e$$

$$L(4,4)=\text{lambda}$$

A pseudoinverse HmLinv for the singular matrix H-lambda can be computed and initialized as follows:

$$LmLinv = \text{zeros}(4, 4)$$
$$LmLinv(1, 1) = \frac{1}{(L(1, 1) - \text{lambda})}$$
$$LmLinv(2, 2) = \frac{1}{(L(2, 2) - \text{lambda})}$$
$$LmLinv(3, 3) = \frac{1}{(L(3, 3) - \text{lambda})}$$
$$HmLinv = X * LmLinv * X'$$

Some four-by-four matrices used to compute Hdot can be initialized as well:

$$Hu=\text{zeros}(4,4);$$

$$Hv=\text{zeros}(4,4);$$

$$Hw=\text{zeros}(4,4);$$

$$Hdot=\text{zeros}(4,4);$$

With these data structures initialized as described, the steps for the iterative refinement of angular velocity pqr can begin. A quaternion derivative is calculated using the estimated angular velocity (604). For example, the quaternion derivative edot can be estimated from the approximate angular velocity pqr as follows:

$$p = pqr(1)$$
$$q = pqr(2)$$
$$r = pqr(3)$$

$$\text{Omega} = \begin{bmatrix} 0 & -p & -q & -r \\ p & 0 & r & -q \\ q & -r & 0 & p \\ r & q & -p & 0 \end{bmatrix}$$

$$edot = (0.5) * \text{Omega} * e$$

The derivatives of the angle eigenmatrix and the eigenvalue are calculated (606). The derivatives Hdot and lambdadot, for example, can be computed by the following process.

First, the derivative of the body frame x-axis in the navigation frame can be estimated as follows:

$$e0dot = edot(1, 1);$$
$$exdot = edot(2, 1);$$
$$eydot = edot(3, 1);$$
$$ezdot = edot(4, 1);$$

$$udot = 2 * \begin{bmatrix} exdot*ex + e0dot*e0 - ey*eydot - ez*ezdot \\ exdot*ey + eydot*ex + e0*ezdot + ez*e0dot \\ ez*exdot + ex*ezdot - e0*eydot - ey*e0dot \end{bmatrix}$$

Next, the trigonometric derivatives for the boresight angles gamma_x can be estimated as follows:

$$Cosdot = udot' * R$$

$$Sindot = -Ctn. * Cosdot$$

$$Ctndot = \frac{(Cosdot.*\text{Sin} - Sindot.*\text{Cos})}{\text{Sin}^2}$$

The sum of the contributions to the eigenmatrix derivative Hdot from the navigation vectors r can be taken, using the data from the process 500 (as described in relation to FIG. 5) as follows:

Hdot=0*Hdot for *i*=1:*N*

Hu(:,:)=Hur(i,:,:);

Hv(:,:)=Hvr(i,:,:);

Hw(:,:)=Hwr(i,:,:);

Hdot=Hdot+Mvdot(1,*i*)*Hv+Mwdot(1,*i*)*Hw+Ctndot (1,*i*)*hu end

The derivative of the eigenvalue lambdadot can be estimated as follows:

lambdadot=e'*Hdot*e

The angular velocity is calculated using the derivatives (608). For example, the quaternion derivative edot can now be calculated based upon the lambdadot and eigenmatrix derivative Hdot estimations:

$$HmLdot = Hdot - \text{lambdadot}$$

$$edot = -1 * HmLinv * HmLdot * e$$

The angular velocity of the body frame is calculated from the quaternion derivative (608). For example, the following matrix equations can now be solved to estimate the angular velocity vector pqr:

$$D = (0.5) * \begin{bmatrix} -ex & -ey & -ez \\ e0 & -ez & ey \\ ez & e0 & -ex \\ -ey & ex & e0 \end{bmatrix}$$

$$edot = D * pqr$$

$$pqr = \frac{D}{edot}$$

The result of the above equations is a new estimate of the angular velocity of the body frame that can be used to better approximate the actual angular velocity.

A quadratic error value is calculated (610). For example, the following computation can be performed and the value of J2(edot) can be saved:

$$J2(edot) = (HmL * edot - HmLdot * e)^2$$

If the error value is substantially identical to the previously calculated error value (612), the process 600 ends. Otherwise, the process 600 returns to estimating the quaternion derivative using the angular velocity of the body frame (604).

After a number of iterations repeating (604) through (610), for example, it is expected that the resulting estimate of the angular velocity pqr is adequately precise. As with the algorithm for estimating the quaternion e, described in relation to FIG. 5, if the actual precise measurements for the quaternion derivative edot were known, then the quadratic error function J2(edot) would be identically zero:

$$J2(edot) = 0$$

Based upon this, iterations can be stopped when the given measurement data available does not appear to be improving the quadratic error estimate. If more accurate cosine derivative measurements become available at a later time, for example, iterations can be renewed.

Figure 7A:
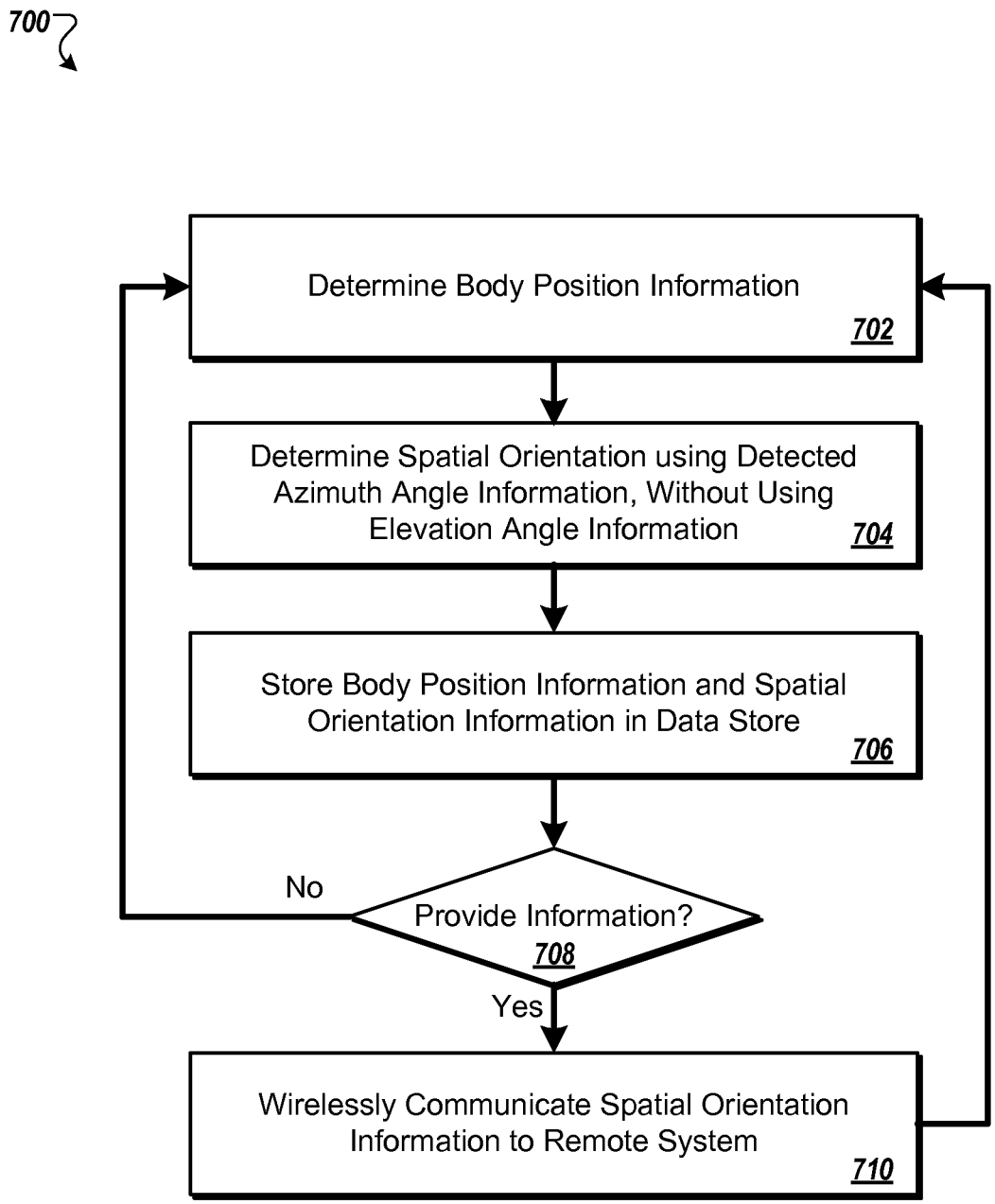
FIG. 7A is a flow chart of an example process for using spatial orientation estimates to provide feedback to a remote system.

FIG. 7A is a flow chart of an example process 700 for using spatial orientation estimates to provide feedback to a remote system. The remote system, in some implementations, can use this information for testing (e.g., in determining whether a spinning projectile followed a path and coning model estimated by the designers), correcting (e.g., adjusting the path of a body which has gone off course), or controlling (e.g., actively adjusting the path of a body). For example, a user at a remote control device could actively adjust the path of a pipeline drill based upon orientation measurements obtained through surface-mounted electromagnetic beacons and a body orientation estimator built into the pipeline drill.

The process 700 begins with determining body position information (702). The body position information, for example, can be determined in a conventional manner, such as through a GPS receiver.

The body orientation is determined using detected azimuth angle information, without using elevation angle information (704). For example, using the process described in relation to FIG. 4, the body orientation can be estimated.

The body position information and the spatial orientation information are collected in a local data store (706). For example, body position data and orientation estimate data can be collected within a data store directly connected to the body.

If the information is ready to be provided remotely (708), the body position information and the spatial orientation information can be wirelessly communicated to a remote system (710). If the body is being actively controlled, for example, the data can be wirelessly communicated to the remote system each time it is calculated. In some implementations, sets of body position data and orientation estimate data can be collected, and the data provided to a remote system periodically. In one example, the data can be provided after every Nth iteration. In another example, the data can be provided on a fixed time schedule (e.g., every ten seconds). The body position data and the orientation estimate data, in some implementations, can be provided to the remote system based upon meeting an error condition. For example, if the body orientation estimate data varies significantly from a planned navigational path, the remote system can be alerted.

Whether or not the information is provided to the remote system, the process 700 returns to determining the body position information (702) based upon the current, and likely different, location and attitude of the body.

Figure 7B:
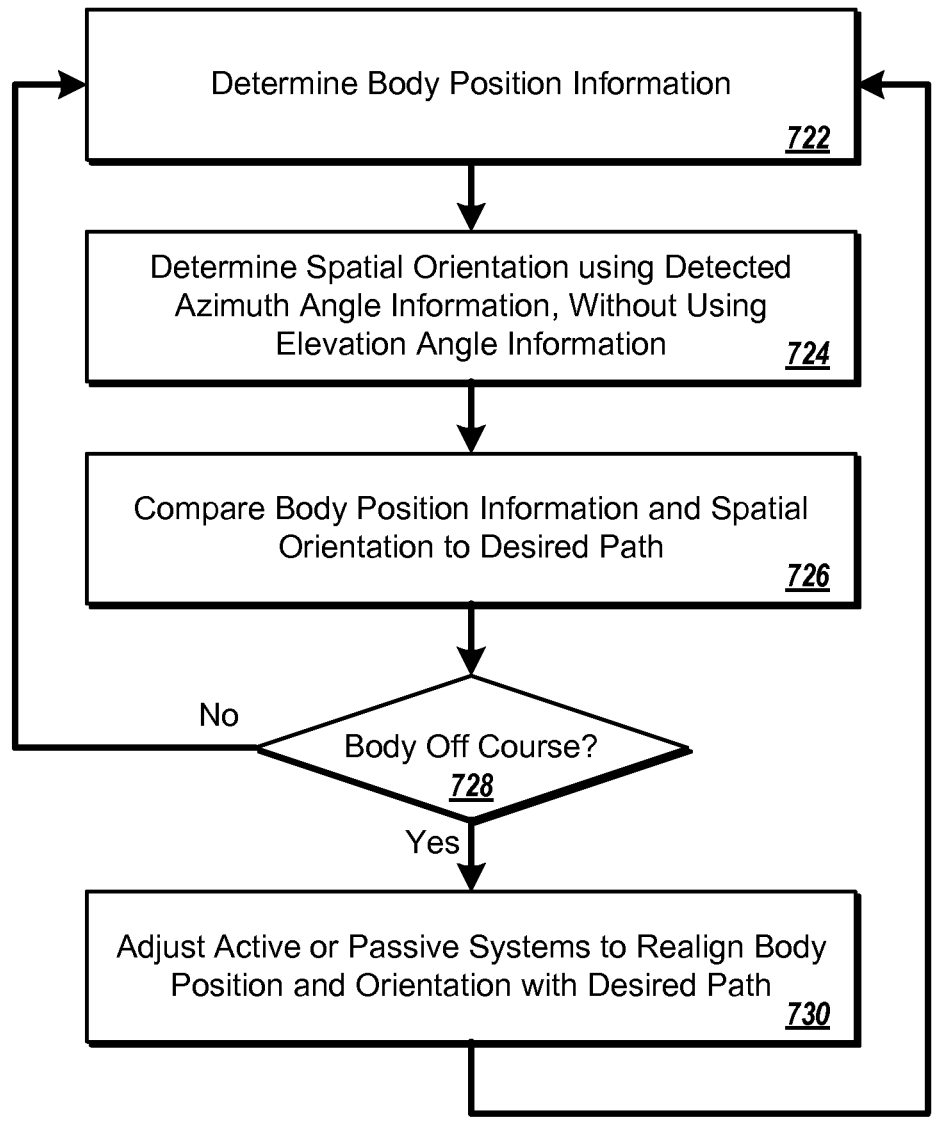
FIG. 7B is a flow chart of an example process for using spatial orientation estimates to adjust the trajectory of a body.

FIG. 7B is a flow chart of an example process 720 for using spatial orientation estimates to adjust the trajectory of a body. The process 720, for example, can be used within the guidance system of a projectile, such as a missile or satellite, or an unmanned craft, such as a helicopter, submarine, or airplane.

The process 720 begins with determining body position information (722). The body position information, for example, can be determined in a conventional manner, such as through a GPS receiver.

The body orientation is determined using detected azimuth angle information, without using elevation angle information (724). For example, using the process described in relation to FIG. 4, the body orientation can be estimated.

The body position information and the spatial orientation are compared to a desired path (726). For example, a pre-determined trajectory or a flight plan can be programmed into a body attitude estimation module, such as the 6DOF body state estimator 108 described in relation to FIG. 1. In some implementations, a threshold comparison can be made between the body position and estimated orientation and the desired path of the body.

If the body is off course (728), the body path can be adjusted to realign the body position and spatial orientation with the desired path (730). In some implementations, the difference between the pre-determined path and the current body position and orientation can be used to adjust the course of the body. In the example of a projectile or an unmanned aircraft, the adjustment can be made through a flight system. In some examples, passive adjustment elements such as wings, fins, or canards, can be adjusted to realign the body with the desired trajectory. If the body is a submarine, for example, the ballast system can be adjusted. Active elements, such as propulsion jets, for example, can be adjusted as well to realign the body.

Whether or not the body is judged to be off course, the process 720 returns to determining the body position information (722) based upon the current, and likely different, location and attitude of the body.

Figure 7C:
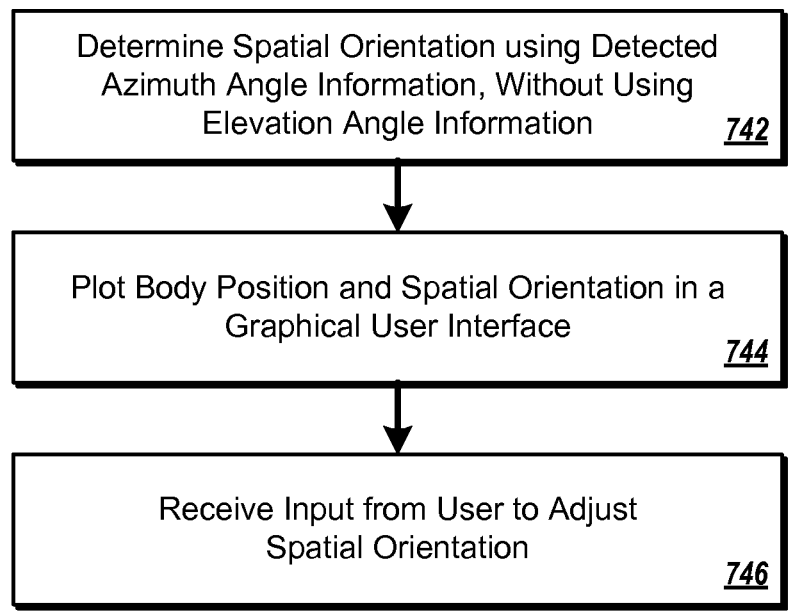
FIG. 7C is a flow chart of an example process for using spatial orientation estimates to provide visual feedback to the pilot of a vehicle.

FIG. 7C is a flow chart of an example process 740 for using spatial orientation estimates to provide visual feedback to the pilot or operator of a vehicle, such as an airplane, helicopter, truck, or submarine. The process 740, in some implementations, can provide a pilot with a visual indication during times when the pilot has limited access to actual visual indication of body orientation. For example, a pilot may have little or no indication of the attitude of the body when traveling through a silted or low visibility region of the ocean or when an airplane enters dense cloud cover. In another example, a cell phone display may be augmented with heading information such that a pedestrian could use the cell phone as a compass to walk out of a dense wooded area. The cell towers can act as navigation beacons for determining the orientation of a cell phone with an antenna capable of detecting azimuth information.

The process 740 begins with determining the body orientation using detected azimuth angle information, without using elevation angle information (742). For example, using the process described in relation to FIG. 4, the body orientation can be estimated.

The body position and spatial orientation are plotted in a graphical user interface (GUI) (744). For example, a false horizon, a simulation of the attitude of the body, or a representation of the attitude of the body frame in relation to the known navigation frame can be plotted graphically within a dashboard area of the vehicle controls or on a display area of a cell phone or remote control.

Input is received from the user to adjust the spatial orientation (746). For example, the user can manually adjust the orientation of the vehicle to realign the vehicle with the false horizon or to straighten the simulation of the attitude of the body.

While the process 740 is described in relation to a manned vehicle, in some implementations, the GUI can be provided to a remote pilot from an unmanned vehicle. For example, when darkness, silt, or cloud cover obscure the path of a remotely-controlled unmanned vehicle, a pilot typically relying upon one or more camera images relayed from the unmanned vehicle can rely upon the process 740 to provide orientation feedback.

Figure 8:
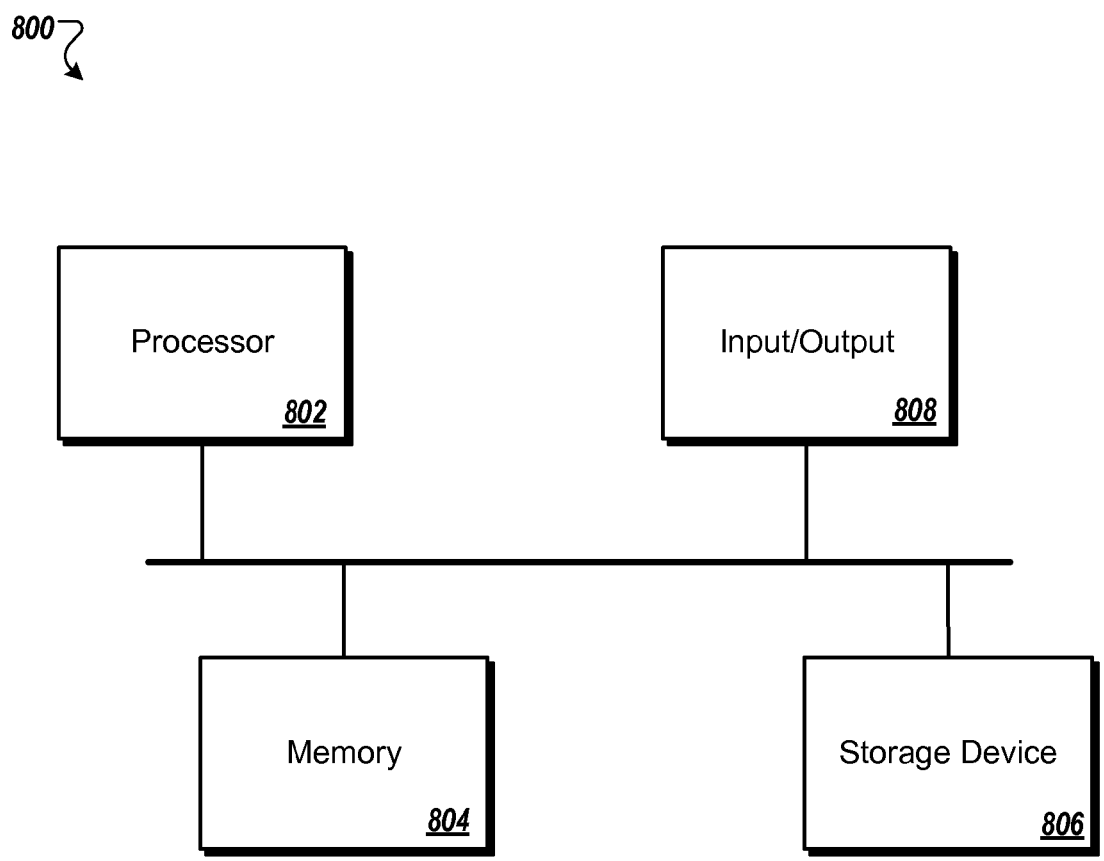
FIG. 8 is a block diagram of computing components that may be used in implementing the computer-implemented processes described in this document.

FIG. 8 is a block diagram of a computing device 800 that may be used to implement the systems and methods described in this document. For example, the computing device 800 may be used in a receiver (such as the receiver 102 shown in FIG. 1) or in a 6DOF body state estimator (such as the body state estimator 108 shown in FIG. 1).

Computing device 800 includes a processor 802, memory 804, a storage device 806, input and output devices 808 such a data entry devices and graphical displays, and a bus system 810 that provides for communications between these components. The processor 802 can process instructions for execution within the computing device 800, including instructions stored in the memory 804 or on the storage device 806 to perform various operations described previously in this document. In addition, the components described in this specification may also be implemented in firmware or on an application specific integrated circuit (ASIC), in which case this FIG. 8 diagram is simply illustrative of device operation.

The features described may be implemented in digital electronic circuitry, or in computer hardware, firmware, software, or in combinations of them. The apparatus may be implemented in a computer program product tangibly embodied in an information carrier, e.g., in a machine-readable storage device for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A machine-implemented method for determining a spatial orientation of a body frame of reference of a body with respect to a navigation frame of reference, the method comprising:
   receiving, by receiving equipment on the body, at least three sets of electromagnetic signals, each of the sets of electromagnetic signals arriving at the body from a different one of at least three separate directions, and obtaining, by the receiving equipment, signal amplitude measurement information for each one of the sets of electromagnetic signals;
   determining a location in space of the body;
   calculating, for each one of the sets of electromagnetic signals, azimuth angle information partially specifying a direction of arrival of the set of electromagnetic signals at the body relative to a body azimuth axis in the body frame of reference;
   determining, by a computing device, the spatial orientation, including yaw, pitch, and roll angles, of the body frame of reference with respect to the navigation frame of reference;
   measuring, using the receiving equipment, rate of change of the azimuth angle information for each of the sets of electromagnetic signals;
   transforming, for each of the sets of electromagnetic signals, the rate of change of the azimuth angle information into a body measurement rate matrix; and
   iteratively refining an approximation of an angular velocity of the body frame of reference with respect to the navigation frame of reference using the body measurement rate matrices,
   wherein the determination of the spatial orientation is performed without using detected elevation angle information.

2. The method of claim 1, wherein each of the sets of electromagnetic signals arrives at the body from a different one of at least three separate transmission sources that have known locations.

3. The method of claim 2, further comprising:
   transforming, by the computing device, the known locations of the separate transmission sources and the determined location of the body into a navigation reference data set; and
   transforming, by the computing device, the calculated azimuth angle information into a body measurement data set.

4. The method of claim 3, wherein the determining the spatial orientation is based on the body measurement data set.

5. The method of claim 3, wherein determining the spatial orientation comprises:
   initializing an attitude quaternion representing an estimate of a present attitude of the body frame of reference with respect to the known navigation frame of reference;
   establishing an angle eigenmatrix representing an approximation using reference values from the navigation reference data set and the body measurement data set;
   iteratively refining the attitude quaternion and the angle eigenmatrix; and
   converting the refined attitude quaternion into equivalent yaw, pitch, and roll angles.

6. The method of claim 1,
   wherein the iterative refinement comprises:
   (a) initializing the angular velocity of the body frame of reference with respect to the navigation frame of reference;
   (b) estimating a quaternion derivative using the angular velocity of the body frame of reference;
   (c) iteratively refining the body measurement rate matrices;
   (d) calculating the angular velocity of the body frame of reference from the quaternion derivative;
   (e) calculating a quadratic error value; and
   (f) comparing the quadratic error value to a previous quadratic error value;
   wherein steps (b) through (f) are repeated for a plurality of iterations.

7. The method of claim 1, wherein the receiving equipment comprises a directional transducer.

8. The method of claim 1, wherein the signal amplitude measurement information varies with only azimuth angles measured around a single azimuth axis fixed in the receiving equipment.

9. A machine-implemented method for determining a spatial orientation of a body frame of reference of a body with respect to a navigation frame of reference, the method comprising:
   receiving, by receiving equipment on the body, at least three sets of electromagnetic signals, each of the sets of electromagnetic signals arriving at the body from a different one of at least three separate directions, and obtaining, by the receiving equipment, signal amplitude measurement information for each one of the sets of electromagnetic signals;
   determining a location in space of the body;
   calculating, for each one of the sets of electromagnetic signals, azimuth angle information partially specifying a direction of arrival of the set of electromagnetic signals at the body relative to a body azimuth axis in the body frame of reference; and
   determining, by a computing device, the spatial orientation, including yaw, pitch, and roll angles, of the body frame of reference with respect to the navigation frame of reference,
   wherein the determination of the spatial orientation is performed without using detected elevation angle information, and
   wherein the receiving equipment comprises a directional transducer.

10. The method of claim 9, further comprising:
    measuring, using the receiving equipment, rate of change of the azimuth angle information for each of the sets of electromagnetic signals;
    transforming, for each of the sets of electromagnetic signals, the rate of change of the azimuth angle information into a body measurement rate matrix; and
    iteratively refining an approximation of an angular velocity of the body frame of reference with respect to the navigation frame of reference using the body measurement rate matrices.

11. The method of claim 9, wherein each of the sets of electromagnetic signals arrives at the body from a different one of at least three separate transmission sources that have known locations.

12. The method of claim 11, further comprising:
transforming, by the computing device, the known locations of the separate transmission sources and the determined location of the body into a navigation reference data set; and
transforming, by the computing device, the calculated azimuth angle information into a body measurement data set.

13. The method of claim 12, wherein the determining the spatial orientation is based on the body measurement data set.

14. The method of claim 12, wherein determining the spatial orientation comprises:
initializing an attitude quaternion representing an estimate of a present attitude of the body frame of reference with respect to the known navigation frame of reference;
establishing an angle eigenmatrix representing an approximation using reference values from the navigation reference data set and the body measurement data set;
iteratively refining the attitude quaternion and the angle eigenmatrix; and
converting the refined attitude quaternion into equivalent yaw, pitch, and roll angles.

15. A machine-implemented method for determining a spatial orientation of a body frame of reference of a body with respect to a navigation frame of reference, the method comprising:
receiving, by receiving equipment on the body, at least three sets of electromagnetic signals, each of the sets of electromagnetic signals arriving at the body from a different one of at least three separate directions, and obtaining, by the receiving equipment, signal amplitude measurement information for each one of the sets of electromagnetic signals;
determining a location in space of the body;
calculating, for each one of the sets of electromagnetic signals, azimuth angle information partially specifying a direction of arrival of the set of electromagnetic signals at the body relative to a body azimuth axis in the body frame of reference; and
determining, by a computing device, the spatial orientation, including yaw, pitch, and roll angles, of the body frame of reference with respect to the navigation frame of reference,
wherein the determination of the spatial orientation is performed without using detected elevation angle information, and
wherein the signal amplitude measurement information varies with only azimuth angles measured around a single azimuth axis fixed in the receiving equipment.

16. The method of claim 15, further comprising:
measuring, using the receiving equipment, rate of change of the azimuth angle information for each of the sets of electromagnetic signals;
transforming, for each of the sets of electromagnetic signals, the rate of change of the azimuth angle information into a body measurement rate matrix; and
iteratively refining an approximation of an angular velocity of the body frame of reference with respect to the navigation frame of reference using the body measurement rate matrices.

17. The method of claim 15, wherein each of the sets of electromagnetic signals arrives at the body from a different one of at least three separate transmission sources that have known locations.

18. The method of claim 17, further comprising:
transforming, by the computing device, the known locations of the separate transmission sources and the determined location of the body into a navigation reference data set; and
transforming, by the computing device, the calculated azimuth angle information into a body measurement data set.

19. The method of claim 18, wherein the determining the spatial orientation is based on the body measurement data set.

20. The method of claim 18, wherein determining the spatial orientation comprises:
initializing an attitude quaternion representing an estimate of a present attitude of the body frame of reference with respect to the known navigation frame of reference;
establishing an angle eigenmatrix representing an approximation using reference values from the navigation reference data set and the body measurement data set;
iteratively refining the attitude quaternion and the angle eigenmatrix; and
converting the refined attitude quaternion into equivalent yaw, pitch, and roll angles.

* * * * *